(12) United States Patent
Kiss et al.

(10) Patent No.: US 6,402,089 B1
(45) Date of Patent: Jun. 11, 2002

(54) SYSTEM FOR CONTROL OF ACTIVE SYSTEM FOR VIBRATION AND NOISE REDUCTION

(75) Inventors: John C. Kiss, Edison; Michael H. Silverberg, Livingston, both of NJ (US)

(73) Assignee: General Dynamics Advanced Technology Services, Inc., Greensboro, NC (US)

(*) Notice: Subject to any disclaimer, the term of this patent is extended or adjusted under 35 U.S.C. 154(b) by 0 days.

(21) Appl. No.: 09/798,420

(22) Filed: Mar. 2, 2001

(51) Int. Cl.[7] ............................................... B64C 27/51
(52) U.S. Cl. .................... 244/17.27; 188/378; 267/136; 181/207; 248/638; 244/54
(58) Field of Search ................................. 181/207, 208, 181/209; 248/638, 550; 367/190; 244/1 N, 1 R, 17.27, 54; 188/378; 267/136

(56) References Cited

U.S. PATENT DOCUMENTS

| | | | |
|---|---|---|---|
| 4,819,182 A | 4/1989 | King et al. ................. 364/508 |
| 5,146,505 A | 9/1992 | Pfaff et al. ..................... 381/71 |
| 5,174,552 A | 12/1992 | Hodgson et al. ........ 267/140.11 |
| 5,316,240 A | 5/1994 | Girard et al. ............ 244/17.27 |
| 5,332,061 A | 7/1994 | Majeed et al. ............... 180/312 |
| 5,418,858 A | 5/1995 | Shoureshi ..................... 381/71 |
| 5,427,347 A | 6/1995 | Swanson et al. ............ 248/550 |
| 5,526,292 A | 6/1996 | Hodgson et al. ............. 364/574 |
| 5,551,650 A | 9/1996 | Southward et al. ........... 244/54 |
| 5,873,559 A | 2/1999 | Von Flotow et al. ........ 248/557 |

*Primary Examiner*—Peter M. Poon
*Assistant Examiner*—Timothy D. Collins
(74) *Attorney, Agent, or Firm*—Moore & Van Allen PLLC; Michael G. Johnston

(57) ABSTRACT

An adaptive controller is used to adaptively generate vibration cancellation signals driving a controlled device which effects an associated vibration and noise-producing plant. The adaptive controller has multiple control paths to generate the control signal. In a vibration attenuation control path(s), an adaptive control signal is generated by plant compensation and adaptive filtering techniques to cancel vibrations. In a position control, saturation prevention path, the available operational extents of the controlled device are monitored and compensation signals are generated which direct the movement of the controlled device in such a manner as to prevent the controlled device from reaching the extents of control. The control signals from the multiple paths are then combined and transmitted to the controlled device which alters in some fashion the noise and vibration being generated or transmitted by the associated vibrating plant.

20 Claims, 7 Drawing Sheets

SYSTEM FOR CONTROL OF ACTIVE SYSTEM FOR VIBRATION AND NOISE REDUCTION

GOVERNMENT RIGHTS

The Government has rights to the invention pursuant to government contract N00014-96-C-2079 awarded by the United States Naval Research Laboratory.

CROSS-REFERENCES

FIELD OF THE INVENTION

The present invention relates to a control system for an active, adaptive vibration and noise attenuation system. The present invention serves as the intelligence of an overall system that has several parts. Generally, the other parts of the control system are sensors for measuring the objectionable vibration and noise and one or more controlled devices for providing a mechanism for altering the production of noise and vibration. In particular, the present invention relates to a control system combining the results of multiple paths to generate a resulting vibration and noise control signal with at least one attenuation path used to generate vibration and noise attenuation signals and at least one other path used to generate signals which seek to control the position of the altering mechanism to prevent saturation of the mechanism.

The present invention also relates generally to a system for controlling an active system for reducing the transmission of vibration and noise passing from a vibrating component to a structure and, more particularly, to a system for controlling an active vibration and noise reduction system for use on a rotary wing aircraft.

Even more particularly, the present invention comprises an Active Transmission Mount Controller (ATM Controller) to be used to control a number of hydraulic actuation systems utilized in active cancellation of vibration in rotary wing aircraft. The ATM Controller controls hydraulic actuators located in-line between each transmission foot and the airframe. The ATM Controller produces outputs that are based on the fundamental blade rotational rate as well as multiples of this rate. In addition, the ATM Controller produces a position control signal to maintain the relative position of the transmission foot and the aircraft.

BACKGROUND OF THE INVENTION

Significant effort has been devoted to reducing the vibratory and acoustic loads on aircraft, particularly rotary wing aircraft such as helicopters, and the resulting vibration and noise that develops within the aircraft. A primary source of vibratory and acoustic loads in a helicopter is the main rotor system.

The main rotor system of a helicopter includes rotor blades mounted on a vertical shaft that projects from a transmission, often referred to as a gearbox. The gearbox comprises a number of gears which reduce the rotational speed of the helicopter's engine to the much slower rotational speed of the main rotor blades. The gearbox has a plurality of mounting "feet" which are connected directly to structure in the airframe which supports the gearbox.

The main rotor lift and driving torque produce reaction forces and moments on the gearbox. All of the lift and maneuvering loads are passed from the main rotor blades to the airframe through the mechanical connection between the gearbox feet and the airframe. The airframe structure which supports the gearbox is designed to react to these primary flight loads and safely and efficiently transmit the flight loads to the airframe.

In addition to the nearly static primary flight loads, the aircraft is also subjected to vibratory loads originating from the main rotor blades and acoustic loads generated by clashing of the main rotor transmission gears. The vibratory loads are strongest at a frequency equal to the rotational speed of the main rotor blades (P), which is generally between about 4 and about 5 Hz, multiplied by the number of rotor blades, typically 2 or 4. The product of the main rotor blades rotational speed and the number of blades is called the "fundamental". Tonals of decreasing vibratory strength occur at multiples of two, three and sometimes four of the fundamental. For example, for a 4 bladed rotor, this would correspond to 8P, 12P, and 16P.

The acoustic loads generated by the transmission gears are at a frequency that the gear teeth mesh with and contact each other, and are thus related to the type of construction and gear ratios used in the transmission. The acoustic loads also include a fundamental and tonals of decreasing strength at integer multiples of the fundamental. Typically, the noise generated by gear clashing is in the range of about 500 Hz to about 3 kHz.

The vibratory and acoustic loads produce vibrations and audible noise that are communicated directly to the helicopter airframe via the mechanical connection between the gearbox and the airframe. This mechanical connection becomes the "entry point" for the unwanted vibration and noise energy into the helicopter cabin. The vibrations and noise within the aircraft cabin cause discomfort to the passengers and crew. In addition, low frequency rotor vibrations are a primary cause of maintenance problems in helicopters.

In the past, "passive" solutions have been tried for reducing the vibratory and acoustic loads on aircraft and the resulting vibration and noise that develops within the aircraft. For noise reduction, passive systems have employed broadband devices such as absorbing blankets or rubber mounts. However, broadband passive systems have generally proven to be heavy and, consequently, not structurally efficient for aircraft applications where weight is paramount. Additionally, broadband passive systems are not very effective at reducing low frequency vibration. A passive technique for reducing vibration involves the installation of narrowband, low frequency vibration absorbers around the aircraft that are tuned to the vibration frequency of interest, typically the fundamental. These narrowband, passive vibration reduction systems are effective, but the number of vibration tonals present in a helicopter may require a number of these systems which then adds significant weight. Additionally, narrowband passive systems work best when placed at ideal locations about the helicopter airframe, many of which may be occupied by other equipment.

More recently, "active" vibration and noise reduction solutions are being employed since active systems have a much lower weight penalty and can be effective against both low frequency vibration and higher frequency noise. Active systems utilize sensors to monitor the status of the aircraft, or the vibration producing component, and a computer-based controller to command countermeasures to reduce the vibration and noise. The sensors are located throughout the aircraft and provide signals to the adaptive controller. The controller provides signals to a plurality of actuators that are located at strategic places within the aircraft. The actuators produce controlled forces or displacements which attempt to minimize vibration and noise at the sensed locations.

Low frequency motion (i.e., vibration) behaves according to rigid body rules and structural models can be used to accurately predict the nature and magnitude of the motion. Since low frequency motion is easily modeled, its negative effects can be cancelled with an active system of moderate complexity. High frequency motion (i.e., noise) at the transmission gear clash frequencies does not obey the rigid body rules present at low vibration frequencies. The use of riveted airframes in combination with the complex mode shapes present at high frequencies makes structural models much less accurate. As a result, active systems for high frequency energy reduction become more complex, requiring large numbers of actuators and sensors to counter the more complex modal behavior of the airframe structure.

Some active systems utilize hydraulic actuation systems and hydraulic actuators to reduce vibration and noise. The hydraulic actuation system is preferred since the hydraulic system provides the necessary control bandwidth and authority to accommodate the frequencies and high loads typically experienced in an aircraft such as a helicopter. Additionally, aircraft typically have hydraulic power sources with spare capacity which can be utilized or augmented.

Two methods of actuator placement are frequently used in active systems: (1) distribute the actuators over the airframe, or (2) co-locate the actuators at, or near, the vibration or noise entry point. The co-location approach places the actuators at or near the structural interface between the transmission and airframe stopping vibration and noise near the entry point before it is able to spread out into the aircraft. This has the advantage of reducing the number of actuators and the complexity of the control system. Active systems using this approach employ actuators mounted in parallel or in series with the entry point to counteract the vibration and noise.

The distributed actuator approach requires a large number of actuators for controlling noise due to the high frequencies, and their associated short spatial wavelength. The large number of actuators can drive up weight and add significantly to control system complexity. One distributed actuator active noise reduction system for use in a helicopter application uses more than 20 actuators to control transmission noise. Distributed actuators for low frequency vibration will be less numerous and are effective at reducing vibration at the sensor locations, but can drive vibration at other areas of the aircraft to levels exceeding those already present.

The parallel actuator approach is effective for low frequency vibration but can produce counteracting forces in the supporting structural elements which can exceed the design limit of the elements and lead to premature failure. Additionally, the parallel approach is not effective at reducing noise because the parallel actuators provide a direct path for noise entry.

The series approach is the most effective in reducing cabin vibration and avoids the introduction of unwanted vibrations. This approach uses actuators mounted in series between the transmission gearbox feet and airframe support structure. In this approach, the gearbox and airframe are isolated from each other connected only by actuators. The gearbox vibrates in its own inertial frame separately from the airframe's inertial frame, isolating the gearbox and airframe in a dynamic sense. This approach interrupts the transmission of vibratory and acoustic energy through the principal entry point thereby preventing vibration and noise from entering the airframe. For this approach to be effective, the vibration and noise isolation system must support the large, static primary flight loads along an axis also requiring dynamic isolation. This system must also maintain the average static position of the transmission relative to the airframe for proper operation of the other helicopter systems, particularly the helicopter engines that couple into the transmission. However, in the series approach, the high frequencies associated with noise lead to complex motions at the entry point which, if fully addressed, may lead to large and heavy actuators to actively control all degrees of freedom at each entry point.

A more efficient way for reducing both vibration and noise in aircraft applications, and particularly helicopters, combines an active system for low frequency vibration reduction with a passive system for high frequency noise reduction. Preferably, the active vibration reduction system will isolate the vibratory load source, such as the main rotor system of the helicopter, and prevent the low frequency vibration generated by the main rotor system from being transmitted to the airframe. The system should efficiently pass the primary flight loads while maintaining the average static position of the gearbox relative to the airframe.

Adaptive controllers for active vibration reduction systems are well known in the art. These controllers monitor vibrations and seek to generate signals which drive devices producing canceling vibrations. The controlled devices used to cancel vibrations act either upon the body producing the objectionable vibrations or the controlled devices may act upon some connection point between the vibration generating machinery and the vibration measurement point. Such connection point efforts include actuators which connect helicopter transmission feet to helicopter cabins.

One method known in the art is to measure the noise and vibration disturbances at locations where cancellation is desired and to feedback this information into an active controller which then makes alteration/cancellation adjustments to reduce the noise and vibration disturbances. Feedback systems tend to be effective when the time delay through the controller actuator and sensors is kept to a minimum.

Existing adaptive controllers assume sufficient authority exists in the vibration cancellation mechanism to respond to the vibration cancellation signals. This may not always be true. For example, a hydraulic actuator used to produce cancellation vibrations may reach the maximum extent of actuation. In such a situation, the actuator could not continue to respond to cancellation signals until the actuator moves sufficiently away from a maximum actuation extent. Cessation of ability to respond has at least two drawbacks. The first is an obvious reduction in the cancellation of the vibration being controlled by the impaired cancellation mechanism. The second drawback is that a mechanism such as an actuator at full extent may exhibit characteristics similar to a fixed mount. Such a fixed mount might reduce the effectiveness of passive vibration reduction techniques used in conjunction with the active vibration control system.

For the foregoing reasons, there is a need for a new control system for active reduction of both vibration and noise. The new controller will transmit output vibration cancellation signals which control an active vibration cancellation mechanism. Such vibration cancellation mechanism will be located within the connection points and in series between a vibration generating component and the mounting location of the component. The controller should employ two or more control paths to ensure that the vibration cancellation mechanism maintains the relative position between the vibration generating component and the mounting location and has sufficient authority to respond to the transmitted vibration cancellation signals.

SUMMARY OF THE INVENTION

It is an object of the present invention to provide a controller for an active control system for simultaneously reducing both vibration and noise in aircraft applications, and particularly helicopters.

Another object of the present invention is to provide a controller for an active device and system for isolating the main rotor system of a helicopter from the airframe for preventing the low frequency vibration generated by the main rotor system from being transmitted to the airframe.

A further object of the present invention is to provide a controller for an active vibration reduction system for passing the primary flight loads of the helicopter from the main rotor system to the airframe while maintaining the average static position of the gearbox relative to the airframe.

According to the present invention, a control system is provided for reducing vibration generated by a vibrating plant, the vibrating plant including a vibrating component, a structure and a mount for mounting the vibrating component to the structure. The control system comprises means for producing controlled vibrations within the mount. Sensors are provided for sensing the current position of the controlled vibration producing means, the vibration being transmitted through the mount from the vibrating component to the structure, and at least one of the characteristic frequencies at which the vibrating plant operates and developing signals indicative thereof. A first controller receives as input the signal from the position sensor located on the controlled vibration producing means and generates an output signal. A second controller receives as input the transmitted vibration sensor signal and the plant rotational sensor signal and generates an output signal. Means are provided for combining the output signals from the first and second controllers into a control signal for controlling the vibration producing means such that the vibration transmitted from the vibrating component to the structure through the mount is reduced.

Further according to the present invention, a control system is provided for an active system for reducing vibration generated by a vibrating plant, the vibrating plant including a vibrating component, a structure and a hydraulic mount for mounting the vibrating component to the structure. The control system comprises at least one hydraulic actuator for producing controlled vibrations within the mount. Sensors are provided for sensing the current position the hydraulic actuator relative to the mount, vibrations being transmitted from the vibrating component through the hydraulic mount to the structure, and at least one of the characteristic frequencies at which said vibrating plant operates. The sensors produce signals representative thereof. A fixed, low bandwidth, near-DC, proportional/integral/derivative (PID)-based broadband control compensation feedback position controller utilizes the position sensor signal to produce position control signals to minimize the offset between the sensed hydraulic actuator position and a predetermined hydraulic actuator position. An adaptive Filtered-X least-mean-square (LMS) based narrow-band vibration controller utilizes the vibration sensor signal to produce vibration control signals at multiple frequencies of the sensed plant characteristic frequencies. Means are provided for combining the position control signals with the vibration control signals and generating an output signal which the hydraulic actuator responds to for producing controlled vibrations in the mount for reducing vibrations transmitted through the mount from the vibrating component to the structure.

Also according to the present invention, a control system is provided for active vibration reduction in a rotary wing aircraft including an airframe and a main rotor system having an engine, a rotor and a transmission gearbox mounted to the cabin support beam located at the top of the airframe by at least one hydraulic mount. The gearbox converts the engine force into the rotational force of a rotorshaft. The control system comprises at least one hydraulic actuator for producing controlled vibrations within the mount. Sensors are provided for sensing the current position of the hydraulic actuator, vibrations being transmitted from the main rotor system through the mount to the airframe, and for sensing the rotational frequency of the rotorshaft and producing signals representative thereof. A fixed, low bandwidth, near-DC, broadband control compensation feedback position controller utilizes the actuator position sensor signal to produce quasi-static position control signals to minimize the offset between the sensed hydraulic actuator position and a predetermined hydraulic actuator position. An adaptive Filtered-X LMS based narrow-band vibration controller utilizes the vibration sensor signal to produce vibration control signals. Means are provided for combining the position control signals with the vibration control signals and generating an output signal which the hydraulic actuator responds for producing controlled vibrations in the mount for reducing vibrations transmitted through the mount from the main rotor system to the airframe.

A feature of the actuator position controller is the attenuation output signals are maintained within a maximum range to which the vibration producing means is capable of responding. The extent of actuation of the actuator is thus maintained around a predetermined point, preferably a center point, to ensure the actuator has sufficient authority to respond to the vibration cancellation signals. The position controller includes a scaling function, a band elimination function, an objective function and a compensation function. In one embodiment, the compensation function produces the position control signal utilizing proportional, integral, derivative control compensation.

The vibration controller features a frequency filter adaptive to isolate sensed vibration signals at frequencies which are multiples of the sensed characteristic or rotorshaft rotation frequency, an objective function characterizing the magnitude of the isolated signals, a compensation function producing a correlation between the isolated signals and the control signal for the controlled vibration producing means, and an adaptive filter which generates attenuation output signals minimizing the isolated, correlated signals. In one embodiment, the frequency filter comprises a band-pass filter and a notch filter receiving as input the characteristic or rotorshaft rotation frequency, the notch filter adapting its filter window based on the input frequency. The vibration controller also features a frequency downshift function which converts the vibration sensor signals to signals at baseband DC and a frequency upshift function which converts the baseband DC signals into in-band, attenuation path-based, vibration control signals. The vibration controller may also include an input function which performs antialiasing and scaling functions on the vibration sensor signals, a normalization function which normalizes the isolated signals, an output function which scales the vibration control signals, and a weight limiting function which evaluates the vibration control signals and transmits a freeze signal to the adaptive filter function affecting the adaptive abilities of the adaptive filter function.

BRIEF DESCRIPTION OF THE DRAWINGS

For a more complete understanding of the present invention, reference should now be had to the embodiment (s) shown in the accompanying drawing(s) and described below. In the drawings.

DESCRIPTION

Figure 1:
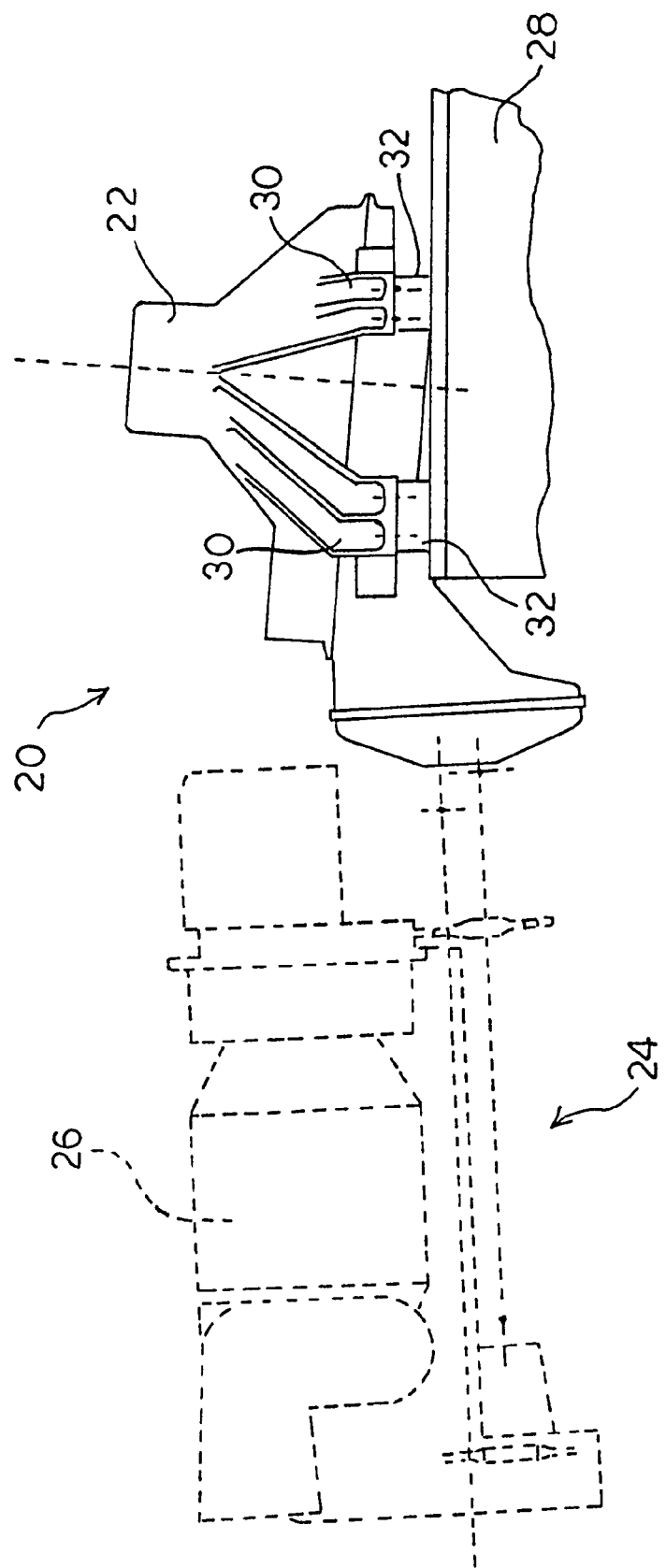
FIG. 1 is a schematic representation of a helicopter transmission arrangement.

Certain terminology is used herein for convenience only and is not to be taken as a limitation on the invention. For example, words such as "upper", "lower", "left", "right", "horizontal", "vertical", "upward", "downward", "clockwise" and "counter-clockwise" merely describe the configuration shown in the FIGs. It is understood that the components may be oriented in any direction in the terminology. Therefore, the present invention should be understood as encompassing such variations unless specified otherwise.

Overview of the Invention

The "Controller" according to one embodiment of the present invention is a signal processing-based and software-based electronics system that receives vibration sensed from a vibrating plant, including a vibrating component and structure, and controls at least one device for inducing changes within the plant to reduce the sensed vibrations. The Controller reduces vibration by combining control signals generated by multiple processing paths into output control signals. At least one of the processing paths, the "Attenuation" path, generates a dynamic control signal utilizing a narrow-band feedback control algorithm. At least one other of the processing paths, the "Saturation Prevention Position Control" path, generates a quasi-static control signal implemented through a fixed, low bandwidth, broadband feedback algorithm. The Attenuation processing path generates signals which drive the controlled devices to reduce the sensed vibrations. The Saturation Prevention Position Control path generates signals intended to prevent the controlled devices from reaching saturation positions such that the controlled devices would no longer be able to respond effectively to the Attenuation path signals. In addition, the Saturation Prevention Position Control path maintains the relative position between the vibrating component of the plant and a desired non-vibrating portion of the plant. In certain embodiments of the present invention, only vibrations at certain frequencies are desired to be controlled. Those frequencies are referred to as the "frequencies of interest".

According to the present invention, functional operations are performed by software executing on a digital signal processor (DSP). Such DSP's are commercially available and include the TMS 320C30 floating point processor. The DSP's typically include a central processing unit (CPU) for execution instructions and performing arithmetical operations, random access memory (RAM) for storing instructions and program data, programmable read only memory (PROM) for storing static data such as program instructions, clock circuitry, and mass storage devices such as disk drives or tape drives. In the following description, reference is made to data being transferred between the functional components of the Controller. Such transfer may involve the sending of signals between electrical components. Such transfer may also include not only the moving of data within the RAM, but also any other method by which one function can indicate to another function the location of data. Such transfer methods include providing the address of data within the RAM. Reference is also made to connections between functional operations of the Controller. Such connections need not necessarily be physical wiring connections, but can represent the flow of control as the DSP executes the program instructions.

The output control signals generated by the Controller drive an actuation system including one or more controlled devices. These controlled devices are attached to the vibrating component of the plant and respond to input signals by producing some change upon the plant which alters the vibrational characteristics of the plant. One example of a controlled device is an active spring that sits on the mounting location between a vibration generating plant and some attached body. Such a spring would respond to signals generated by the Controller by either stiffening or adjusting the resonant frequencies at which the spring would vibrate which would alter the vibrations being transferred through the spring to the attached support structure. Another example of a controlled device is an active transmission mount located in series between the transmission of a rotary wing aircraft and the airframe. The active transmission mount includes hydraulic actuators which respond to the Controller by altering the degree of hydraulic actuation of the transmission relative to the airframe, thus altering the vibrations transmitted through the active transmission mount. Other means for altering the vibration characteristics of a plant are well known in the art.

Referring now to the drawings, wherein like reference numerals illustrate corresponding or similar elements throughout the several views, FIG. 1 illustrates a transmission arrangement 20 for a helicopter. The transmission arrangement 20 includes a gearbox 22 which is connected to a helicopter rotor head (not shown). The gearbox 22 is also connected to the drive train 24 of the helicopter's engine 26. The gearbox 22 is supported by an airframe comprising a structural element 28. The gearbox 22 includes a plurality of mounting feet 30 which are attached to the airframe structure 28. Active transmission mounts (ATMs) 32 are mounted in series between each gearbox mounting foot 30 and the airframe structure 28 for isolating the mounting feet 30 of the main rotor gearbox 22 from the airframe.

Figure 2:
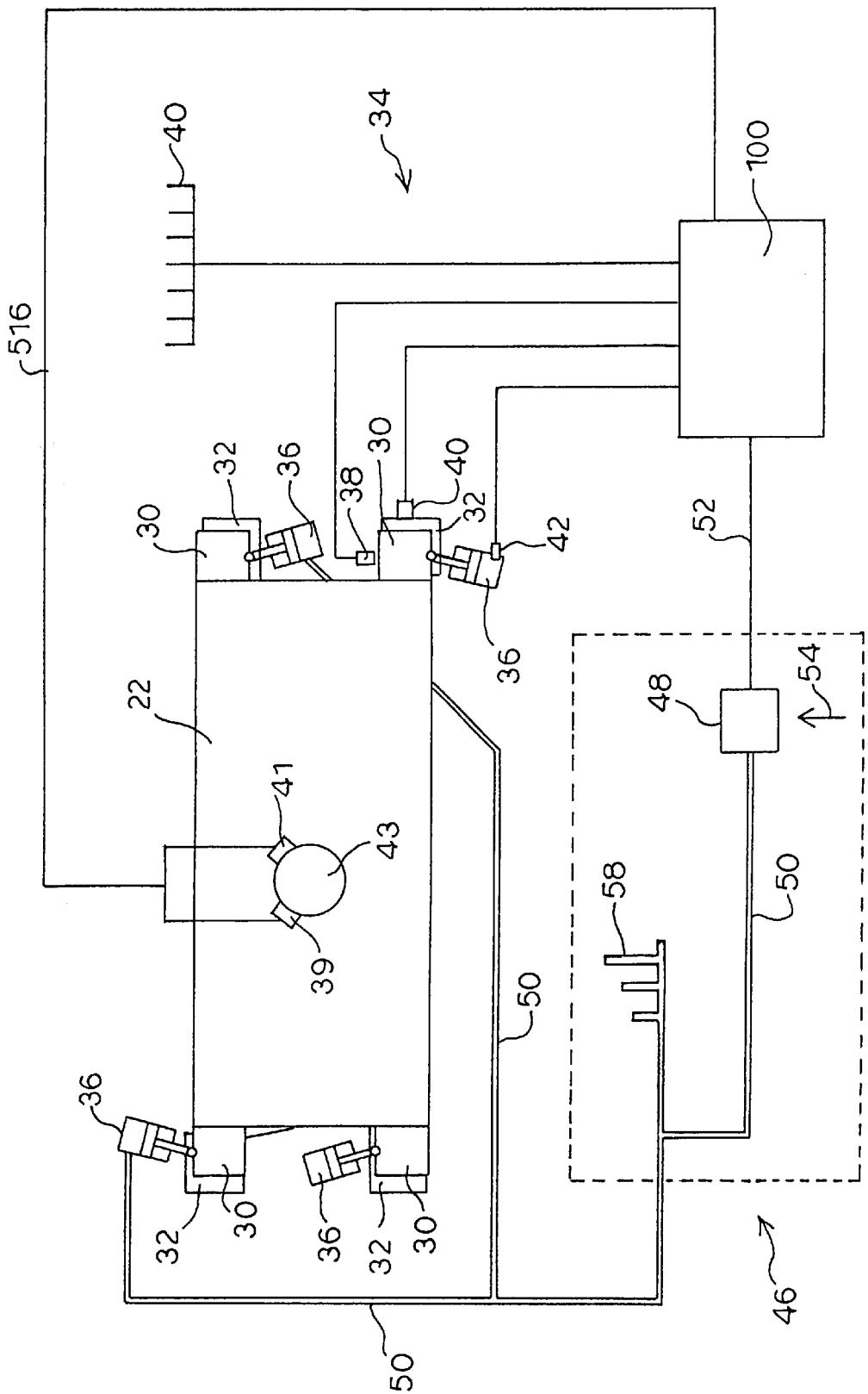
FIG. 2 is a schematic representation of an embodiment of a system for reducing vibration and noise passing from a helicopter transmission gearbox to the airframe.

The ATM 32 is a part of an active transmission mount system 34, an embodiment of which is schematically illustrated in FIG. 2. In FIG. 2 the ATM system is viewed looking down at gearbox 22. The ATM system 34 comprises one or more hydraulic ATM actuators 36 associated with each of four ATMs 32, a plurality of sensors 38–42 positioned throughout the aircraft, and an electronic Controller 100 which sends signals to a hydraulic actuation system 46 for commanding the actuation system to actuate the ATM actuators 36 according to the desired operational state. For simplicity only a single ATM actuator is shown connected to each ATM 32 and transmission foot 30.

The sensors comprise position sensors 38 for monitoring the static position of the feet 30 relative to the airframe 28. These sensors 38, shown for a single actuator 36 and gearbox foot 30 combination in FIG. 2, are used along with the Controller 100 and the actuation system 46 to ensure that the transmission does not move out of static alignment with other elements of the airframe. The preferred location and type of sensors 40, 42 are a function of the type of control approach used by the Controller 100. For example, one type of control approach utilizes sensors 40 that are located adjacent to the mounting feet 30 and the ATM's 32. These sensors 40 comprise accelerometers to sense airframe acceleration. This same control approach may use pressure sensors 42 to sense dynamic pressure fluctuations in the actuator fluid lines 50. An alternate control approach may use accelerometers 40 mounted at selected locations within the airframe, such as at the foot of the pilot or a seat. The choice of local sensors (accelerometers 40 or pressure sensors 42) or remote accelerometers 40 is largely based on the type of airframe to which the ATM system 34 is applied and is also based on the stiffness requirements defined for the ATM actuators 36. Other sensors 39, 41 are located on the main rotor shaft 43 for measuring the rotational rate of the shaft 43.

The signals output from the sensors 38–42 are provided for processing to the Controller 100. For each mounting foot 30, the Controller 100 determines the position of the foot 30 and vibratory loading of the airframe based on the sensed signals being transmitted by the sensors. The Controller 100 then determines a desired operational state for each ATM actuator 36 as a function of one or more of the sensed signals and operates to nullify position offset of the gearbox 22 while also reducing the vibratory load passing through the ATMs 32 and into the airframe.

The hydraulic actuation system 46 supplies a hydraulic fluid under pressure to each hydraulic actuator 36 so that the actuator moves in the desired manner and at the desired frequency to reduce the sensed vibrations emanating from a mounting foot 30 of the gearbox 22 passing into the airframe. In the illustrated embodiment, the hydraulic actuation system 46 includes one or more electro-hydraulic valves 48 which are each electrically connected to the Controller 100 via a control line 52 for supplying current to the valve 48. For example, the hydraulic inputs of two of the actuators 36 shown in FIG. 2 are interconnected into a common hydraulic fluid line 50 and connected to the hydraulic control valve 48. For the sake of simplicity, only a single hydraulic control valve 48 and associated hydraulic interconnections are shown. The Controller 100 generates output control signals to the hydraulic control valve(s) 48 in response to the signals received from the sensors 38–42. The valve(s) 48 open and close in response to the output control signals to provide a vibratory flow of high pressure hydraulic fluid from a fluid source (not shown) to and from the actuators 36. In FIG. 2, the supply flow into the valve 48 is generally indicated at 54. The hydraulic pressure and location of the actuators' pistons are thus adjusted by the Controller 100 based on the signals from the sensors 38–42.

The active transmission mount system 34 of the present invention acts to isolate the vibratory and acoustic loads generated by the main rotor gearbox 22 from the airframe. The ATM system 34 achieves vibration reduction by controlling the applied fluid flow within the ATM actuators 36, and thus the hydraulic pressure acting on the pistons in the actuators 36. A quasi-steady pressure is applied to each actuator 36 to react to the applied quasi-steady flight and maneuvering loads. The vibratory loads that are applied along the actuator's principle, or "active", axis are transmitted into the hydraulic column. This causes cancellation of pressure fluctuations which would otherwise be transmitted into the airframe causing vibration if left unaltered. Generally, an increase in hydraulic pressure on the pistons when a vibratory load pushes on the actuator 36 is relieved by the ATM system 34 by removing fluid, and a decrease in hydraulic pressure when a vibratory load pulls on the actuator 36 is accommodated by the ATM system 34 by increasing hydraulic fluid flow to the actuator. Hence, the actuator 36 is operated by removing and supplying a sufficient amount of hydraulic fluid against the head of the piston to allow the piston to translate in substantially the same direction and at substantially the same frequency as the vibrating gearbox 22. In this way, the ATM system 34 allows relative motion between the gearbox 22 and the airframe at low vibration frequencies, typically greater than about 2 Hz, so that the gearbox 22, in effect, floats in a dynamic sense with respect to the airframe, but maintains a steady, static position relative to the airframe. As a result, vibratory pressure is minimized, thereby reducing the transfer of vibration related to the applied rotor vibratory loads from the ATM 32 to the airframe.

The Controller 100 functions within the ATM system to reduce vibrations by combining two control signals which are generated by a vibration controller and a position controller, respectively, for each hydraulic control valve 48. The vibration controller provides a dynamic control signal utilizing a narrow-band feedback control algorithm. The position controller provides a quasi-static control signal implemented through a fixed, low bandwidth, broadband feedback algorithm. The position controller seeks to keep the position of the actuators 36 at a desired point located near the midpoint of the actuator's displacement range. Keeping the transmission foot from reaching the "hard-stop" position on the actuators 36 allows optimal dynamic narrow-band isolation of low frequency vibrations (20 Hz to 60 Hz).

Actuator "hard-stops" define the minimum and maximum extent of the actuator's displacement range. Keeping the transmission foot from reaching the "hard-stop" position on the actuators 36 also allows optimal passive, narrow band isolation of high frequency noise (e.g., >500 Hz) with a passive noise isolator 58. The passive isolator 58 introduces softness into the hydraulic system at predetermined frequencies to allow the system to attenuate high frequency and low amplitude, $\frac{1}{1000}$ inch, noise that is otherwise transmitted by the gearbox feet 30 to the ATM 32 causing high frequency noise in the fluid lines 50 which, in turn, leads to noise in the aircraft. In order to reduce this high frequency noise, the hydraulic line 50 is connected to the passive isolator 58 which in one embodiment is one or more tuned stubs. It is understood that the other hydraulic lines (not shown) that interconnect the valves 48 and their associated actuators 36 are also connected to passive isolators.

Figure 3:
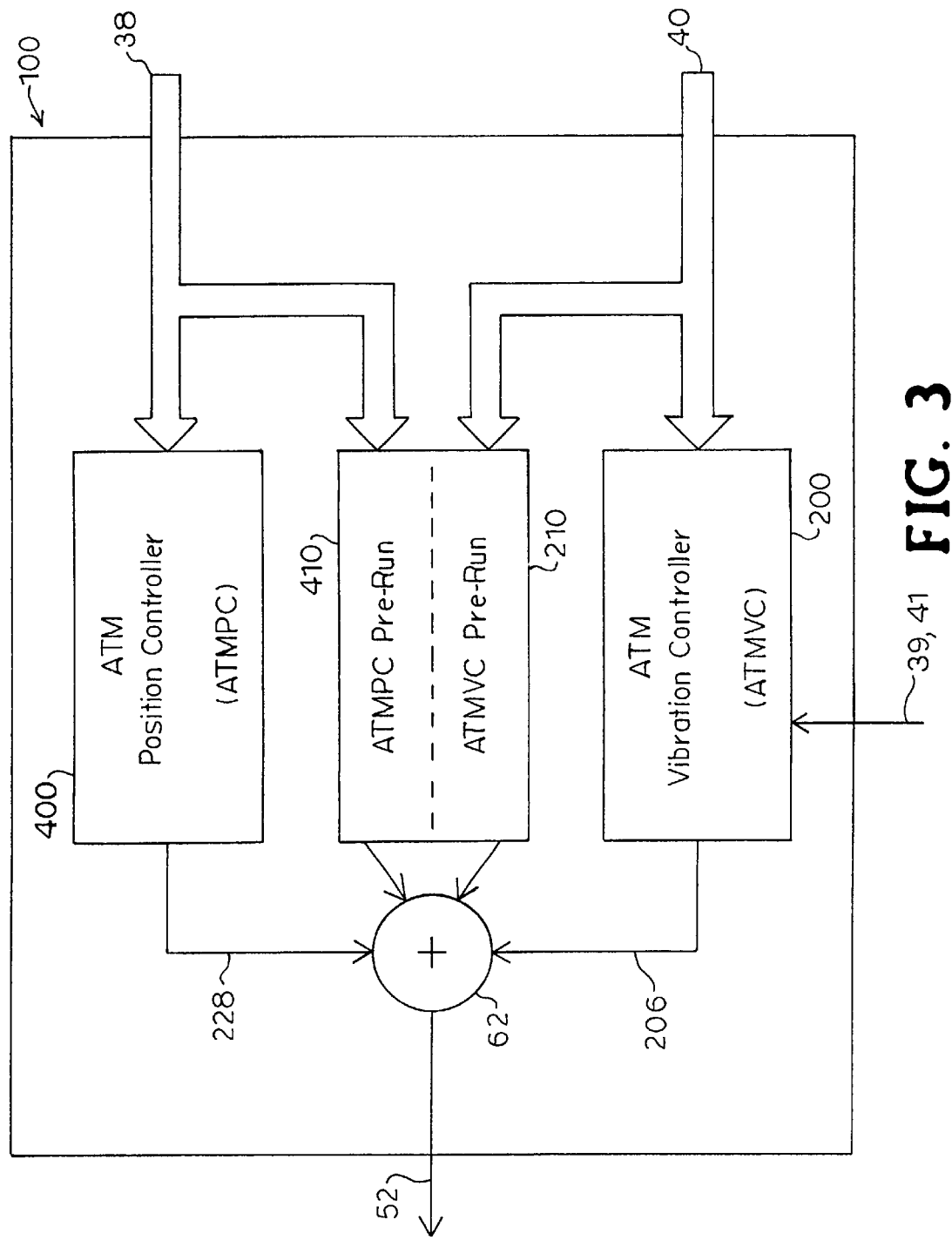
FIG. 3 is a schematic representation of a control system according to the present invention shown in an embodiment of an active system for vibration reduction with two control paths.

Referring now to FIG. 3, the Controller 100 for the ATM comprises an ATM vibration controller (ATMVC) 200, an ATM position controller (ATMPC) 400, an ATMVC pre-run 210 and an ATMPC pre-run 410. The ATMVC 200 is responsible for providing vibration control output signals on line 206 to cancel sensed vibrations. Thus, the ATMVC 200 serves to attenuate vibrations. The ATMVC 200 vibration control output signals are based upon vibration sensor input signals received from the accelerometers 40 and the rotational rate input signal received from the rotation sensors 39, 41 on the rotor shaft 43.

The ATMPC 400 is responsible for providing position control output signals on line 228 to keep the actuators 36 properly centered around a desired position. Thus, the ATMPC 400 serves to prevent the actuators 36 from "saturation", which occurs if the extent of actuation of the actuators 36 approaches either the minimum actuator extent or the maximum actuator extent. The position control output signals are derived from the position sensors 38.

The position controller output signal on line 228 and the vibration controller output signal on line 206 are combined using digital summing 62. The resulting Controller 100 output on control line 52 is converted from digital to analog form and serves as the input signals to the hydraulic control valves 48 connected hydraulically to one or more actuators 36.

The ATMPC Pre-Run 410 and ATMVC Pre-Run 210 are active only during the initial set-up training phase of the Controller 100. During this set-up training phase, sample control outputs are sent to the hydraulic control valves 48. The Controller 100 correlates changes in sensed vibrations from the sensors 40 with each sample output. The Controller uses this correlation to build a model of the signal transfer characteristics between the actuator 36 and sensor 40. This signal transfer characteristic is called the actuator-to-accelerometer transfer function. This model is then used to help calculate the vibration reduction control signals generated by the Controller 100 in its normal operational mode which are transmitted to the hydraulic control valves 48 on control line 52. Preferably, the model of the actuator-to-accelerometer transfer function is created by using the ATMVC Pre-Run 210 as a structural-probing function and calculating a model based on measurements from the probing signals. It is understood that alternate methods of creating models would suffice for the purpose of obtaining an actuator-to-accelerometer transfer function. These alternate methods include building equations into the Controller 100 based on mathematical or theoretical models on how a plant behaves.

The ATMPC Pre-Run 410 determines the signal voltage levels required to drive the actuator 36 to each opposing hard-stop. From these voltage levels, a centering voltage is calculated. For the case shown in FIG. 2 with two actuators 36 driven from a single servo valve 48, the centering voltage calculation is based on the minimum voltages required to drive the two actuators 36 to their respective hard-stops. The ATMPC Pre-run-410 and the ATMVC Pre-Run 210 are run sequentially.

Figure 4:
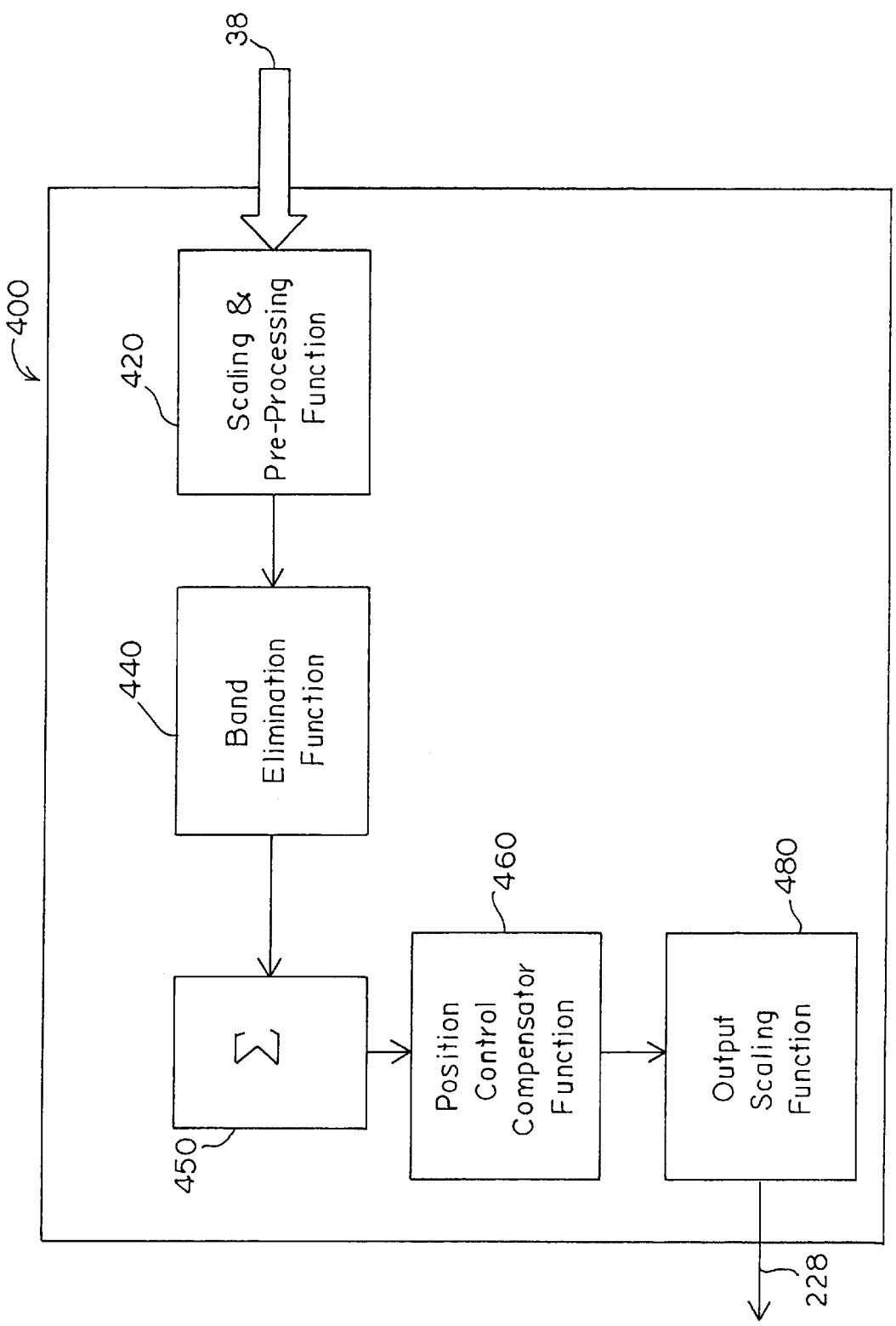
FIG. 4 is a schematic representation of an embodiment of a saturation prevention position control path in a control system according to the present invention.
Figure 5:
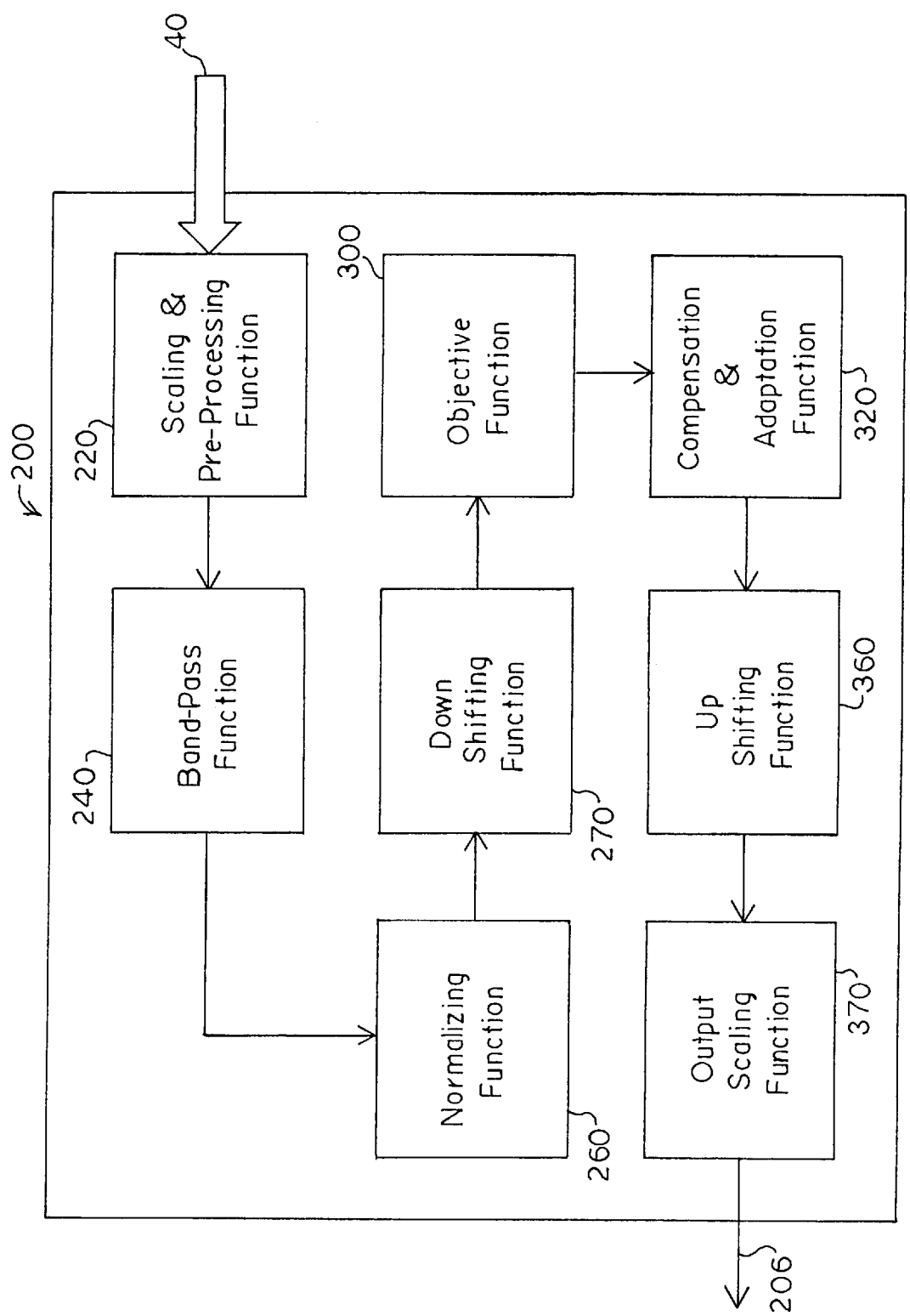
FIG. 5 is a schematic representation of an embodiment of a vibration attenuation control path in a control system according to the present invention.

FIGS. 4, 5 and 6 depict an embodiment of a Controller 100 according to the present invention. It is understood that the present invention could be implemented using other algorithms for the attenuation and saturation prevention position control paths. Therefore, nothing in the description of the following embodiment is intended to limit the present invention to only those described for this specific implementation. One skilled in the art could easily implement alternatives to these specific algorithms that have the same effect of controlling vibration while preventing the controlled devices from reaching control extents which no longer allow for full ranges of vibration control.

FIG. 4 illustrates a preferred embodiment of the ATMPC 400. The position sensor 38 signal for each of the actuators 36 at the input of the ATMPC 400 is first processed by a scaling and pre-processing function 420 which applies signal level scaling and analog filtering. The resultant signal is then processed through a band-elimination function 440, removing those frequencies that are not required for use in by the ATMPC 400. The resulting signal is then compared to the signal level of a desired actuator position 455 in the summing box 450. The difference between these two signals is sent to the position control compensator function 460 which provides spectrum equalization. This signal is sent to an output scaling function 480, providing output gain control. Preferably, the ATMPC 400 uses a fixed, low bandwidth, near-DC, broadband control compensation feedback algorithm known as the proportional/integral/derivative (PID) controller approach. The ATMPC 400 provides a quasi-static position controller output signal on line 228.

FIG. 5 illustrates a preferred embodiment of the ATMVC 200. The vibration sensor 40 signals at the input of the ATMVC 200 are first processed by a scaling and pre-processing function 220 which applies signal level scaling and analog filtering. This is the same signal level scaling and analog filtering used in the ATMPC 400. The resultant signal is then processed through a spectrum band-pass function 240, allowing only the spectrum of frequencies necessary for vibration control. The resultant signals are normalized in a normalizing function 260, and frequency downshifted in a down shifting function 270 which feeds into an objective function 300. The signals are then processed in a compensation and adaptation function 320 including an adaptive filter which seeks to minimize the vibrations being sensed and processed. The adaptive filter outputs the signals to an upshifting function 360 and then to an output scaling function 370, providing spectrum equalization and output gain control, respectively. A preferred adaptive filter for use in the compensation and adaptation function 320 uses a Filtered-X LMS algorithm approach together with a narrow-band compensation approach to achieve narrow-band feedback control. This approach is robust since it allows the controller to adapt to changes in the vibration control actuator-to-accelerometer transfer function. The ATMVC 200 path provides a dynamic vibration controller output signal on line 206.

Position and Vibration Control Common Processing Path

Figure 6A:
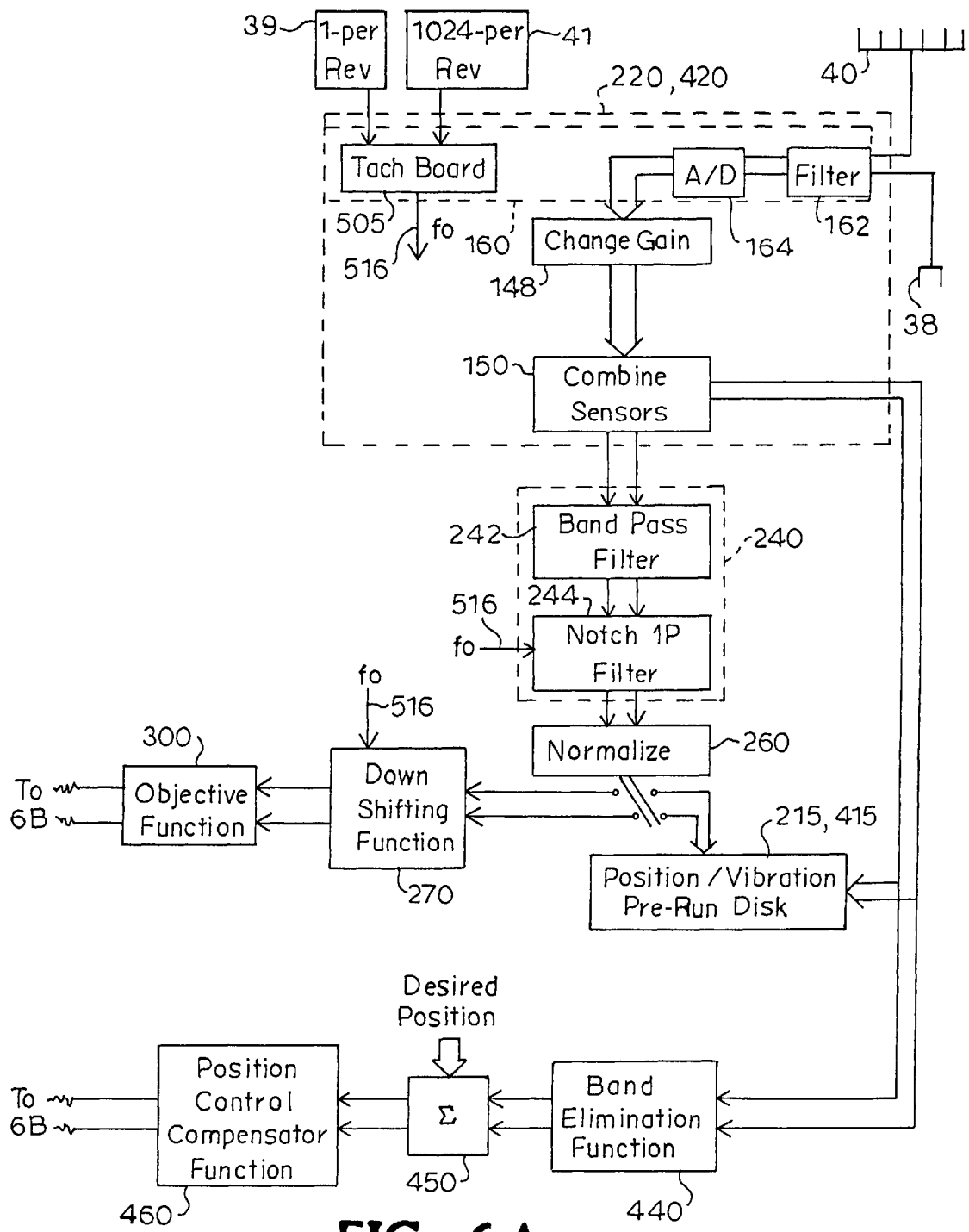
FIGS. 6A and 6B are a flow diagram of an embodiment of a control system according to the present invention with one vibration attenuation control path and one saturation prevention position control path.
Figure 6B:
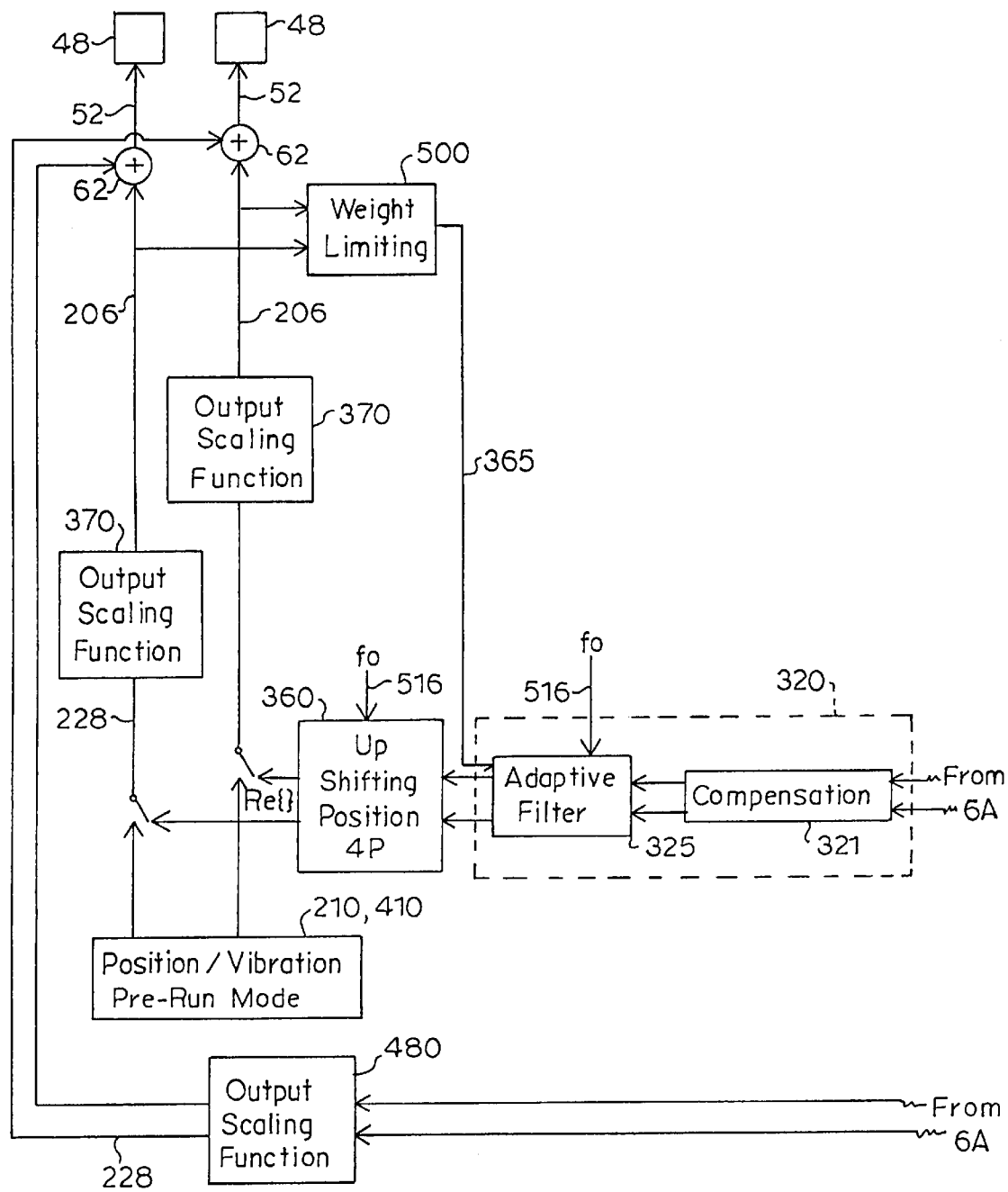

Referring now to FIGS. 6A and 6B, a detailed description of a preferred embodiment of the Controller 100 according to the present invention is presented. FIGS. 6A and 6B show control processing for a 2-dimensional system for the control of two hydraulic control valves 48. A complete ATM system 34 for a rotary wing aircraft with four transmission feet 30 may have a dedicated hydraulic control valve 48 for each of eight or more ATM actuators 36. The input position sensor 38 (FIG. 6A) and vibration sensor 40 signals are processed initially in a common processing path. This common processing path contains the ATMPC scaling and pre-processing function 420 and ATMVC scaling and pre-processing function 220 discussed above. Within this common path, the sensor signals are processed by a data acquisition Unit (DAU) 160, gain control function 148 and a sensor combining function 150. The DAU provides anti-alias filtering 162, scaling and conversion from analog to digital format 164. In a preferred embodiment, these functions are performed by a single DAU 160.

For anti-aliasing purposes, the DAU 160 must filter out (i.e., eliminate) frequencies higher than the Nyquist folding frequency and deliver digital values at the execution rate of the Controller 100. Nyquist frequency analysis is well known within the art. Additionally, the DAU 160 should provide a sample with enough accuracy, preferably 16-bit digital samples, for processing, along with programmable analog gains and sufficient anti-aliasing filter types. A suitable DAU 160 is a Tustin Series 2100 Data Acquisition Unit System produced by Tustin Electronics Company of Anaheim, Calif., U.S.A.

In an ATM system 34 for a rotary wing aircraft, the Controller 100 preferably executes at 512 Hz. This sampling rate allows for the potential of processing signals above the targeted highest frequency of 12P or 60 Hz. Therefore, a filter 162 frequency of 200 Hz may be used, which is below the Nyquist folding frequency of (512 Hz/2)=256 Hz. For anti-aliasing purposes, the preferred DAU 160 incorporates a bank of 8-pole/8-zero elliptic low pass filters with a cutoff frequency of 200 Hz. The cutoff frequency is programmed into the unit via the digital configuration table. The 8-pole/8-zero elliptical low-pass filter has desirable qualities such as linear phase delay over the vibration control bandwidth in the frequencies desired to be reduced as well as providing sufficient attenuation in the stop band. Linear phase delay over the bandwidth of interest translates in a simple, and undistorted, time shift of the original vibration control signal, which contains the frequencies of interest. Also, the magnitude of this time delay is small enough not to interfere with the position controller feedback loop. Regarding the stop band attenuation, the 8-pole/8-zero elliptical low-pass filter provides large attenuation in order to minimize effects for signal aliasing. This filter type is effective for small frequency ranges, particularly in the vibration control frequency band between 20 Hz and 65 Hz. In applications other than rotary wing aircraft in which the bandwidth of the signals that the vibration control path seeks to reduce differs considerably, anti-aliasing filters appropriate to the new bandwidth would replace the existing elliptical filters.

The Tustin 2100 DAU has a programmable gain feature which allows the user to specify a 16-bit word for each input channel which controls the gain level for that channel. Each channel corresponds to a single vibration or position sensor. The Tustin 2100 allows the user to use 12 bits as a gain amplitude factor. It is an engineering principle that a 2× voltage increase=6 dB. This principle is discussed in the book Introduction to Electrical Engineering, Authors: J. David Irwin, David V. Kerns, Jr., Publisher: Prentice-Hall (1995); ISBN: 0023599308. With 12 bits, where each bit represents a 2× increase, the amplitude gain can range from 0 to 66 dB.

The values used to program the Tustin DAU for anti-aliasing and gain purposes are stored in a digital configuration table. The data within the digital configuration tables includes the 200 Hz filter cutoff frequency and a gain factor for each input channel. Some sensors may have an input signal on the order of millivolts. By using the analog gain feature provided by the Tustin DAU to scale the sensor signals up to approximately the +/−5 volt range, more of the full useful dynamic range of the A/D unit from 0 to +/−10 volts are utilized when the signals are converted to digital form. This scaling permits greater accuracy in reading sensor signals to be processed later, but are not a necessary component of the present invention. For sensors that supply input signals with larger magnitudes, scaling is unnecessary.

Although the above description uses a single DAU 160 which incorporates multiple functions, the anti-aliasing 162, scaling and A/D conversion 164 need not be done within a single device. Multiple devices could easily be arranged to perform the same functions as the preferred DAU performs.

The processed signals from the DAU 160 are then sent to the change gain function 148. The change gain function 148 equalizes the magnitude of the vibration sensor signals 40 and the position sensor signals 38 separately. The change gain function 148 multiplies the input digital samples in the discrete time-domain with a set of digital coefficients stored in memory in, for example, a coefficient table. Each sensor input is multiplied with a single corresponding coefficient within the coefficient table. This set of numbers within the coefficient table is usually greater than or equal to unity. The change gain function 148 provides the user with the ability to maintain, upgrade and adapt the Controller 100. Due to these advantages, a preferred embodiment of the present invention includes a change gain function 148.

The sensor combining function 150 separates the filtered and digitized input sensor 38 and 40 signals into position and vibration signals. Preferably, this separation is done implicitly by arranging the vibration and position sensor signals in memory and then passing the address of the vibration sensor signals to the vibration processing path and the address of the position sensor signals to the position processing path.

Vibration Control Processing Path

After the common vibration and position sensor signal processing, the vibration signals are processed by the vibration control processing path (VCPP). The VCPP can conceptually be broken into three phases: the preprocessing phase consisting of the band pass function 240 and the normalizing function 260; the vibration control phase consisting of the downshifting function 270, the objective function 300, the compensation and adaptation function 320 (FIG. 6B), and the upshifting function 360; and the postprocessing phase consisting of the output scaling function 370 and the weight limiting function 500.

Preprocessing the Vibration Input Sensor Signals

After the sensor combining function 150 (FIG. 6A) has separated the vibration and position sensor signals, the vibration signals are filtered by the band-pass function 240 to pass only signals with frequencies which are desired to be controlled. In the preferred embodiment, this filtering is accomplished with a band-pass filter 242 followed by a notch 1P filter 244. In some applications, the frequencies of interest are known before operation and no measurement during operation is necessary for the Controller 100. In other applications, the frequencies of interest have a relationship to some base rate at which the associated vibration-generating component operates. Measurement of this base rate permits the Controller 100 to isolate and control vibrations of the frequencies of interest.

In the rotary wing aircraft application, the base rate is the rotorshaft rotational rate P, and the measurement is performed by the rotation sensors 39, 41. The rotation sensors 39, 41 may comprise one tachometer with two TTL-compatible analog inputs which measure the rotorshaft rotational rate P. A 1-per-rev tachometer 39 permits a mean estimate of the 1P frequency while a 1024-per-rev tachometer 41 provides an enhanced means to estimate both the mean and variance of the 1P frequency. The Tustin DAU 160 provides two separate TTL-compatible inputs, one for each of the tachometer signals. A tachometer board 505 examines the TTL signals received by the DAU 160 and provides to this input a number representing the rotorshaft rotational rate, P. This number is represented by $f_0$ adjacent signal line 516. The use of multiple inputs in a tachometer provides redundancy in case one tachometer input fails.

The band-pass filter 242 passes only those signals with frequencies of interest and preferably comprises a parallel connection of second order sections. The band-pass filter design is done off-line using filter design techniques using as parameters a 512 Hz sampling frequency, cutoff frequencies and the number of second order sections to use. The parameters used to design the filter are dependent upon the required filter response and would be evident to one skilled in the art.

After the band-pass filtering 242, the filtered sensor signal is transmitted to the notch 1P filter 244. The notch 1P filter 244 is useful after the band pass filtering step 242 because the notch 1P filter 244 provides a much higher attenuation of the base rate (e.g., 1P) frequency than the band-pass filter 242. The notch 1P filter removes the input signal corresponding to 1P. In the rotary wing aircraft application, the 1P frequency needs to be filtered to prevent any influence on the primary control frequency. The design of the notch 1P filter 242 assures no phase shift of control frequencies of interest (i.e., 4P, 8P and 12P) which lie outside the 1P frequency of attenuation.

The input to the notch 1P filter 244 on signal line 516 is a measurement of the base rate at which the controlled plant is operating. In embodiment shown in FIG. 6, this measurement is received from the tachometer board 505 described above. This measurement updates the coefficients of the notch 1P filter 244 to keep the filter focused around the current 1P frequency as closely as possible. In the embodiment shown in FIG. 6 the coefficients for the notch filter 244 are not updated based upon the tachometer reading because the plant's base rate, the rotorshaft rotational rate, does not change appreciably during operation. It is understood that for a rotary wing aircraft application with varying base rates of a few percent, modification of the notch filter 244 coefficients based on the associated plant's base operational rate is preferred and is within the present invention.

The band-pass filter 242 and notch 1P filter 244 could be modified or combined as necessary depending on the set of frequencies of interest. Other filters could be implemented as long as the result is a signal in which the frequencies of interest are present and frequencies not desired are sufficiently attenuated after filtering.

Band pass filter design is well known. One method of creating the band pass filter 242 is by using a software tool called Matlab produced by The MathWorks, Inc., of Natick, Mass., U.S.A. Wave digital filter techniques may be used to design notch filters. Design methodologies for such filters are commonly known in the art. References that detail such methodologies include:

1. Circuits and Systems, A Modern Approach, written by Athanasios Papoulis and published by Holt, Rinehart and Winston (1980) (ISBN 0030560977).
2. Digital Filters: Analysis and Design, written by Andreas Antoniou and published by:
   McGraw Hill (1993) (ISBN 007002121X).

After filtering the vibration sensor signals to pass only the frequencies of interest, the vibration sensor signals are transmitted to the normalizing function 260. Preferably, the normalizing function 260 comprises simple vector scaling. Each input sensor signal value is multiplied by a predetermined scaling factor. This scaling factor is determined to provide an equivalent level of 1 Volt in its digital 16-bit representation implemented in a 32-bit floating point numeric processing architecture. This level is empirically determined to facilitate a smoother conversion of the adaptive section.

The normalizing function 260 aids the user's ability to maintain, upgrade and adapt the ATM Controller 100. The normalizing function 260 facilitates these goals by making the system more modular. Due to these advantages, the preferred embodiment of the present invention includes the normalizing function 260.

Vibration Control Phase

The Vibration Control Phase includes the downshifting function 270, the objective function 300, the compensation and adaptive function 320 (FIG. 6B) including an adaptive Filter 325, and the upshifting function 360. The Vibration Control Phase is executed separately for each frequency of interest. In the rotary wing application, the frequencies of interest are 4P, 8P and 12P. For simplicity, FIGS. 6A and 6B show only the Vibration Control Phase at 4P. Many methods of separate execution are well known in the art and include multi-tasking, sequential execution and parallel execution on separate processors. The present invention does not depend on the method of separate execution other than the requirement that the processing for all frequencies of interest must be completed within the one execution cycle. In the embodiment shown in FIGS. 6A and 6B, the Controller 100 executes at 512 Hz. Preferably, the processing for the frequencies of interest is executed on the same Digital Signal Processor (DSP) in a sequential manner. In the following description, the term "NP" is used to represent the individual frequency being processed for each of the frequencies of interest.

Referring to FIG. 6A, the downshifting function 270 performs a frequency downshift of the vibratory load signal at NP to base-band. Base-band in the preferred embodiment is DC (frequency=0 Hz). An additional input to this function is the $f_O$ parameter from the tachometer process received on signal line 516, from which NP is computed and used to generate a complex sinusoidal look-up table which performs the NP frequency downshift. The downshift corresponds to the following formula:

$$\text{baseband} = \text{FILTERED SIGNAL} * (e^{-j\omega n})$$

where

FILTERED SIGNAL=vibration control signal filtered through the frequency filters described above; and "j" is the imaginary number ($j = {}^2\sqrt{(-1)}$) and $(e^{-j\omega n}) = \cos(\omega n) - j\sin(\omega n)$ and ω=the angular frequency currently being processed (i.e. 4P/8P/12P in the preferred embodiment) in radians/sec=$2 \times \pi \times NP$ n=the current sample count.

The above equations require calculating sine and/or cosine values. In the embodiment shown in FIGS. 6A and 6B, the main 1P frequency component is very steady with negligible variance. Thus, it is possible to construct an "a priori" sine wave table in two steps. The sine wave table supplies the necessary sine and cosine values.

In the first table creation step, a table of length M floating point numbers (32-bit) is created. In the embodiment shown in FIGS. 6A and 6B, M=5120 elements. This length provides a sinusoidal look-up capability with a resolution $f_B$ of 512 Hz/5120 element=0.1 Hz per element. Different resolutions (coarser or finer) can be achieved with a different table length within the limits of the DSP memory resources. It is understood that as long as the variance of the base frequency is small, a coarse table resolution can be constructed. Otherwise, a larger table needs to be constructed in order to keep $f_B$ small.

In the second table creation step, the table of length M is populated one entry at a time using the following equation:

$$\cos(2\pi \{f_B/f_S\} N \, n) \tag{A}$$

where $f_B$=Resolution Frequency in Hz, $f_S$=Sampling frequency in Hz,

N=harmonic order (1,2, . . . ,int($f_S/2$)), n=0,1,2, . . . ,(M−1).

Thus, for N=1, each sample of the table is used to produced $f_B$, and in order to produce N*$f_B$, every other N sample is used to construct it. For example, for $f_B$=0.1 Hz, the 4P frequency component (20.8 Hz) would be obtained using N=208. In this case, every other $208^{th}$ sample is used to generate the 4P signal.

The lookup into the sinusoidal table is done by calculating

FrequencyJump=CurrentFrequency/Resolution (i.e., NP/$f_B$)

CurrentIndex=(CurrentIndex+FrequencyJump)MOD TableSize

Note that a unique CurrentIndex must be stored in memory for each separate controlled frequency and its value must be retained between execution cycles.

Another application of the present invention may allow for a precise sinusoidal generator based upon the following second order recursive equation:

$$x[n] = 2\cos\left(\frac{2\pi f}{f_s}\right)x[n-1] - x[n-2] \quad (B)$$

where f is the oscillator frequency and $f_S$, is the sampling frequency which, in the embodiment shown in FIGS. 6A and 6B, is 512 Hz. A reference for the implementation of equation (B) is "Improving Performance of Digital Sinusoidal Oscillators by Means of Error Feedback Circuits" IEEE Transactions on CAS, Vol. CAS-33, No. 4, April 1986, p. 373. Other methods of sinusoidal generation are well known in the art and may be used as desired based on processing, memory and resolution constraints.

The downshifting function 270 creates a complex number with both a real and an imaginary value for each of the sensor signals of the form:

(FILTERED SIGNAL*cos(ωn)) and (FILTERED SIGNAL*(−j sin(ωn))

This complex number is processed through the objective function 300 and compensation and adaptation function 320 (FIG. 6B) portions of the Vibration Control Phase. The real and imaginary value are converted back to a single real number in the upshifting function 360. The downshifting 270 and upshifting 360 functions are, in effect, inverse operations in the time and frequency domains, since the signal is multiplied by the complex exponential. The functions perform inverse frequency shifting in the Fourier domain. Note that the terminology of modulation and demodulation are also used in the art for the downshifting and upshifting functions described here.

Objective Function

The objective function 300 (FIG. 6A) permits the user to emphasize reduction of the sensed values of certain sensors deemed to be more effective in reducing target vibrations while de-emphasizing those sensors deemed to be less effective in vibration control performance.

In the embodiment shown in FIGS. 6A and 6B, the objective function 300, "Q", comprises a default unity matrix (i.e., each sensor 40 is equally weighted) or a variant thereof with selected null entries for those sensors 40 which empirically do not contribute to performance. The matrix "Q" is a square matrix with the number of row/columns equal to the number of input vibration sensor readings emanating from the downshifting function 270. The matrix entries, or weights, are complex numbers determined based on empirical analysis of the effect that each sensor's readings have on overall vibration control performance. Within the objective function 300 matrix, several of the imaginary matrix components are 0, but this is dependent on an analysis of the results of the objective function 300.

The weights are selected to optimize performance based upon input signal constraints, which are related to the squares of the Q-matrix entries. The type of constraints that are defined in the objective function 300, through the use of the Q-matrix, depend on the inclusion of input vibration sensor 40 weightings according to the following equation:

$$I_j = \alpha_{j1}V_1[n] + \alpha_{j2}V_2[n] + \ldots + \alpha_{jk}V_K[n] \, | j=1,2,\ldots, K \quad (*)$$

Equation (*) above produces a particular constraint signal $I_j$ through the selection of the $a_{ji}$. The $V_j[n]$ represent the resultant signals from the downshifting function 270. The equivalent matrix representation for equation (*), which includes all constraint signals $I_j$, is expressed by (**) below:

$$\bar{I} = \bar{\alpha}\bar{V}; \bar{I} = \begin{bmatrix} I_1 \\ I_2 \\ \vdots \\ I_K \end{bmatrix}; \bar{\alpha} = \begin{bmatrix} \alpha_{11} & \alpha_{12} & \cdots & \alpha_{1K} \\ \alpha_{21} & \alpha_{22} & & \alpha_{1K} \\ & & & \\ \alpha_{K1} & \alpha_{K2} & & \alpha_{11} \end{bmatrix}; \bar{V} = \begin{bmatrix} V_1[n] \\ V_2[n] \\ \vdots \\ V_K[n] \end{bmatrix}$$

The coefficients $a_{ij}$ are such that are row-normalized as defined in the following equation:

$$|\bar{\alpha}_j| = 0 < \frac{1}{\sqrt{12}}\sqrt{|a_{j1}|^2 + |a_{j2}|^2 + \ldots + |a_{jk}|^2} \leq 1 \quad (***)$$

This expression (***) geometrically means the projection of the vector $\bar{V}$ on the vector $a_j$, which expresses the optimization of the vector $\bar{V}$ along the objective vector $a_j$.

In the embodiment of the Controller 100 shown in FIGS. 6A and 6B, these weights do not vary dynamically. Preferably, the objective function 300 stores a separate matrix for each of the frequencies of interest.

Compensation and Adaptation Function

Referring to FIG. 6B, the compensation and adaptation function 320 consists of the compensation function 321 and the adaptive filter function 325. The compensation function 321 allows for the compensation of the actuator-to-sensor transfer function measured in ATMVC pre-run 210. The compensation function 321 maps the relationship between a given output control signal sent to the associated servo valve 48 on signal line 52 and the effect on the vibrations generated by the associated actuator 36 as measured by each vibration sensor 40. The purpose of the compensation function 321 is to negate the phase shift and amplitude change resulting from the response of the accelerometers 40 to controlled actuator drive signals.

Preferably, this correlation consists of a matrix of complex numbers, the plant compensation matrix.

Plant Compensation Training

The compensation function 321 is determined during the vibration prerun 210 execution. During vibration prerun 210, a set of control signal outputs, called probe signals,) are generated and sent to the hydraulic control valves 48 on control line 52. The vibration prerun 210 then records inputs from the vibration sensors 40 which have gone through the vibration pre-processing phase described above. These sensor 40 inputs are correlated with the control signal outputs which were applied to the plant on control line 52.

The correlation is calculated using the Fourier sine-cosine coefficients at the frequencies of interest which, in a rotary wing aircraft application, are 4P, 8P, and 12P. The vibration prerun 210 generates a cosine series which is output to the controlled device, that is, the hydraulic actuator 36 (not shown). A sine series is also generated but not used as output. After a waiting period which allows the plant to stabilize, the vibration prerun 210 accumulates five running sums for each sensor 40:

Sum 1—The product of the cosine series and the preprocessed sensor reading input (device response)

Sum 2—The product of the sine series and the preprocessed sensor reading input

Sum 3—The square of the cosine series

Sum 4—The square of the sine series.

Sum 5—The product of the sine and cosine series

The in-phase and lagging terms are computed using these sums. The procedure is to drive the first controlled device by the generated cosine series and obtain the response of all sensors. Each sensor's response constitutes one row within column one of a response matrix. The second controlled device is then driven by the generated cosine series and the responses recorded constitutes column two of the response matrix. This process is continued until all the controlled devices have been driven by the generated cosine series, and thus, all the columns within a plant compensation matrix are created. The compensation matrix is calculated as the pseudo-inverse of the plant compensation matrix unless the number of valves 48 equals the number of sensors 40, in which case a square matrix inverse is used.

The user supplies the following parameters to the vibration prerun 210 function:

$f_0$—frequency (Hz)

A—signal amplitude to produce desired output (volts)

$T_r$—ramp-up time to reach signal amplitude A (seconds)

$T_w$—wait interval before beginning calculations (seconds)

$T_a$—accumulation time (seconds)

$n_v$—number of control output signals which equals the number of controlled devices $n_e$—number of error sensors In the embodiment shown in FIGS. 6A and 6B, the frequencies are 4P, 8P and 12P and typical ramp-up time and wait intervals are two seconds and accumulation time is 4 seconds. Based on these parameters, for each frequency of interest, the vibration prerun 210 calculates:

| | | |
|---|---|---|
| Angular frequency | $w_0 = 2\pi\phi$ | |
| Total number of samples | $n_s = (T_a + T_w)f_s$ | ($f_s$ = sampling frequency) |
| No. of samples for ramp-up | $n_r = T_r f_s$ | ($f_s$ = sampling frequency) |
| No. of samples to skip | $n_w = T_w F_s$ ramp-up) | ($f_s$ = sampling frequency) |

The accumulation values, $yx_1$, $yx_2$, $xs_1$, $xs_2$, $xs_3$, which correspond to Sum1, Sum2, Sum3, Sum4, and Sum5, respectively are set to zero.

For each sample point on which a correlation will be made, vibration prerun 210 will generate and output to the controlled device the cosine series value: $x_1(k) = A \cos(kw_0T_s)$ $k=0, \ldots, n_s$ generate the sine series value: $x_2(k) = A\sin(kw_0T_s)$ $k = 0, \ldots, n_s$ obtain preprocessed sensor input $y(k)$ for each sensor Beginning at sample $n_w$ (end of wait period) vibration prerun 210 will calculate and accumulate until $n_s$ (total number of samples) the following sums described above:

Sum 1: $yx_1(k) = yx_1(k-1) + y(k)x_1(k)$ $k = n_w, n_w+1, \ldots, ns$

Sum 2: $yx_2(k) = yx_2(k-1) + y(k)x_2(k)$ $k = n_w, n_w+1, \ldots, ns$

Sum 3: $xs_1(k) = xs_1(k-1) + x_1(k)x_1(k)$ $k = n_w, n_w+1, \ldots, ns$

Sum 4: $xs_2(k) = xs_2(k-1) + x_2(k)x_2(k)$ $k = n_w, n_w+1, \ldots, ns$

Sum 5: $xs_3(k) = xs_3(k-1) + x_1(k)x_2(k)$ $k = n_w, n_w+1, \ldots, ns$

After final sample $n_s$, vibration prerun 210 will calculate the following values:

| | |
|---|---|
| Determinant | $d = xs_1(n_s)xs_2(n_s) - xs_3(n_s)^2$ |
| In-phase term | $a = (xs_2(n_s)yx_1(n_s) - xs_3(n_s)yx_2(n_s))/d$ |
| Out-of-phase-term | $b = (-xs_3(n_s)yx_1(n_s) + xs_1(n_s)yx_2(n_s))/d$ |
| Phase of response | $\phi = \tan^{-1}(b/a)$ |
| Magnitude of response | $h_0 = \text{sqrt}(a^2 + b^2)$ |
| Complex response | $h = h_0(\cos\phi - i\sin\phi)i = \text{sqrt}(-1)$ |

The value h constitutes the row entry for the current sensor input being processed in the column which represents the controlled output device currently being driven by the generated cosine series.

Once all sensors 40 have been processed for each controlled device, a response matrix H has been calculated. The plant compensation matrix is the inverse of H. If H is a non-square matrix—the number of controlled devices does not equal the number of sensors—then a pseudo-inverse matrix is calculated using the H hermitian which is equal to the transpose conjugate of H. Techniques for calculating the transpose conjugate are well known in the art. The following set of equations defines how the plant compensation matrix is calculated from the response matrix H in the situation where there are two controlled outputs.

| | |
|---|---|
| Matrix response | $H = [h_{ij}]$: input $i$, output $j$ |
| Compenstion | If $n_v = n_e$: $H^{-1}$ (matrix inverse of $H$) |
| | Otherwise: $H^+$ (psuedoinverse) |
| Condition No. of $H^H H$ | See formula 2 for controlled output case below |

Pseudoinverse:

$h_{ij}$=transfer function between error sensor i and valve j.

H=response matrix with each element $h_{ij}$ containing the transfer function between error sensor i and controlled output j.

$H^{30}$ $=(H^H H)^{-1}H^H$ ($H^H$=H hermitian=H transpose conjugate)

For a Controller 100 with more than two control output control lines 52, the plant compensation matrix would be calculated in a similar manner. In essence, this process is continued until all of the controlled devices have been driven by the generated cosine series, and thus, all the columns within the plant compensation matrix are created, which, in general, is non-square.

In the embodiment shown in FIGS. 6A and 6B, the vibration prerun 210 function collects and stores the actuator-to-accelerometer transfer function measurements for the vibration control path, providing complex number entries for the plant compensation matrix. The Controller 100 software allows the user the option to store the individual sensor streams to an external storage device such as a disk 215 (FIG. 6A). If the individual sensor streams are stored to an external storage device such as a disk 215, the plant compensation matrix could be calculated by an offline function external to the Controller 100 which performs any equivalents to the above calculations. For a rotary wing aircraft application, the plant compensation training process is preferably performed periodically, every few seconds, to account for changes in the actuator-to-accelerometer transfer functions as the aircraft changes flight conditions.

Further, according to the embodiment shown in FIGS. 6A and 6B wherein the controlled device is a hydraulic actuator 36, the level of the cosine series output to the actuator 36 during vibration prerun 210 is manually adjusted to prevent the attached plant from railing at the two piston hard-stops. Once an initial adjustment is made, further manual adjustments before each execution are unnecessary. This manual adjustment capability can be modified to become automated for the preferred rotary wing application.

Plant Compensation Processing During Vibration Control Mode

The objective function 300 sends to the compensation function 321 (FIG. 6B) function an array of weighted values. The number of elements within the array is equal to the number of vibration sensors. In a preferred embodiment, the compensation function 321 multiplies the input array with the plant compensation matrix resulting in an array with a number of elements equal to the number of hydraulic control valves 48. The resultant array represents a column vector of frequency downshifted, base-band, compensated signals in complex number notation.

Adaptive Filter

The compensation function 321 outputs the resultant array described above to the adaptive filter 325. The adaptive filter 325 seeks to generate output signals sent to the upshifting function 360 which will essentially minimize the values of the vibration sensor signals 40 which have a base-band, compensated version of the signal.

Preferably, the adaptive filter 325 is a Filtered-X Least Mean Squares (Fx-LMS) filter. Feed-forward algorithms such as the Filtered-X Least Mean Squares (LMS) algorithm minimize the measured disturbance signals using a gradient descent algorithm to adapt the coefficient of a FIR (Finite Impulse Response) filter. With Feed-forward systems, the FIR filter coefficients are updated so that the transfer function from the disturbance source to the disturbance signals where cancellation is desired, is equal to the net transfer function from the source through the reference sensor, FIR filter, and actuator to the same disturbance signals. The adaptive algorithm computes a FIR filter that best equalizes these two paths. These algorithms are effective when the reference sensors are coherent with the error signals and have a small time delay with respect to the source, and the system controlled is linear. The Filtered-X LMS algorithm is described in the textbook "*Adaptive Signal Processing* written by Bernard Widrow and Samuel Stearns ® 1985, Prentice-Hall Inc., ISBN: 0130040290".

The preferred Fx-LMS algorithm also receives on line 516 the $f_0$ signal representing the rotor rotational rate from the tachometer board 505, as described above. The $f_0$ signal is used as a reference by the Fx-LMS in its processing to generate output values which will minimize the array values received from the compensation function 321.

Preferably, the Fx-LMS function also receives a signal on line 365 from the weight limiting 500 function, described below. This signal causes the Fx-LMS to freeze its adaptive coefficients until another signal on line 365 permits the Fx-LMS to continue adjusting its adaptive coefficients.

The Upshifting Function

For each output frequency to be controlled (i.e., attenuated) (4P, 8P and 12P), the upshifting 360 function receives from the adaptive filter 325 one complex number for each controlled output. The upshifting 360 function performs a frequency "upshift" of the vibratory load signal at base-band to NP, as described relative to the downshifting function 270 above. An additional input to this function is the $f_0$ parameter from the tachometer process on line 516, from which 4P, in the embodiment shown in FIG. 6, is computed and used to generate a complex sinusoidal look-up table which performs the 4P frequency up-shift. The complex number is converted to a single real output signal by the following calculations $$\text{OutputSignal}[i][n] = \text{Re}\{(A+jB)e^{j\omega n}\}$$

Where i=1 . . . Number of Controlled Outputs

Re(X)=real portion of complex number X $(e^{j\omega n})$=cos($\omega$n)+j sin($\omega$n) and $\omega$=2*$\pi$*frequency currently being processed (i.e. 4P/8P/12P in the preferred embodiment)

n=the current sample count.

After the upshifting 360 function is applied to the output of the adaptive filter 325, the real part of the resultant complex number is extracted. This is indicated as Re { } in FIG. 6B. The necessary sine and cosine tables are generated as described relative to the downshifting function 270 above. In the embodiment shown in FIGS. 6A and 6B, one set of tables is generated and shared between the downshifting and upshifting functions 270, 360.

Vibration Post Processing

After the Vibration Control Phase has generated an output control value for each controlled output, an additional output scaling function 370 is applied to the output value received from the upshifting function 360. The output scaling function 370 permits an additional adjustment of the degree of responsiveness the controlled device will exhibit to the signals generated by the Vibration Control Phase. In the embodiment shown in FIGS. 6A and 6B, the output scaling function 370 adjusts the degree of actuation of the actuators 36 (not shown) used to control vibrations. The output scaling function 370 consists of a single multiplication of each upshifting function 360 output by a predetermined real number, the ValveGainFactor. Alternatively, the output scaling function 370 may apply more involved mathematical functions to the output control value than the described single multiplication.

After the output scaling function 370, the weight limiting function 500 receives the output control signals on line 206 and makes one final evaluation of the output control values. The weight limiting function 500 compares the output control values with threshold values. If the threshold values are exceeded, the weight limiting function 500 sends a signal on line 365 which causes the adaptive filter 325 to freeze its adaptive coefficients. When the output control values subsequently fall below the threshold values, the weight limiting function 500 sends a signal on line 365 which allows the adaptive filter 325 to continue adapting its coefficients.

The adaptive filter 325 will tend to increase its output values in efforts to converge to a solution. In some limited circumstances, these efforts to converge to a solution will result in output control values which could possibly damage the controlled device. By freezing the adaptive filter 325 coefficient values when this objectionable situation occurs, the weight limiting function 500 provides an additional safety measure. In the embodiment shown in FIGS. 6A and 6B, the weight limiting function 500 incorporates predetermined threshold values specified so as to prevent the actuators 36 from exceeding their actuatorial authority and damaging either the actuators or the attached plant.

The weight limiting function 500 could optionally be eliminated from a Controller 100 used in an application in which no concern over the scale of output signals existed. Such situations could include attachment to a plant that cannot be damaged by objectionable output control values or inclusion of measures within other portions of the Controller 100 to prevent the output control values transmitted on line 206 from reaching objectionable levels.

Position Control Processing Path

Referring to FIG. 6A, after the common position sensor and vibration sensor scaling and pre-processing function 220, 420, the position control path processes the signals received from the position sensors 38. The position control path consists of the common scaling and pre-processing function 420 (discussed above with respect to the vibration control processing path), the band elimination function 440, the position control compensation function 460, and the output scaling function 480 (FIG. 6B). The goal of the position control processing path is to keep the controlled device properly positioned so that the vibration control path has as much authority as possible to reduce the vibrations at the controlled frequencies 4P, 8P and 12P while providing static load to the attached structure.

For example, in the ATM for a rotary wing aircraft, each actuator 36 has a position sensor 38 that measures the current positional displacement of the actuator 36. The goal of position control path is to keep the actuators properly positioned around a desired point while providing static loads (vertical actuators) and thrust/torsional loads (horizontal actuators) to the structure.

The position control algorithm should be structured to be flexible and allow for several possibilities. Open loop integral response is desired for zero steady state error. A fixed, low bandwidth, near-DC, broadband control compensation is desirable. In one embodiment of the ATM controller, this corresponds to a first order low-pass transfer function positional closed loop response.

As shown in FIG. 6A, the band elimination function 440, which in a preferred embodiment is a notch filter, receives the scaled and preprocessed position sensor signals from the scaling and pre-processing function. The band elimination function 440 removes any components of the frequencies of interest of the vibration control signal present in the position control signal. The position of the controlled device will be changing based on the signals generated by the vibration control path. The goal of the position control path is to counteract low frequency movements, but not those at the frequencies of interest. By removing the frequencies of interest from the position control signal of the output control signal, the Controller 100 reduces the possibility that the position control path will generate signals which counteract the vibration control efforts of the vibration control paths. The band elimination function 440 is designed using the techniques described above for the notch filter of the vibration controller.

The band elimination function 440 transmits the resulting position control signals to the summing box 450. The summing box 450 computes the difference between the desired position of the actuator and the current scaled, pre-processed and band eliminated position sensor signal.

The output of the summing box function 450 is processed by the position control compensation function 460 using the proportional/integral/derivative (PID) algorithm, which is well known in the art. One reference in which the PID algorithm, is described is Analog and Digital Control System Design: Transfer-Function, State-Space, and Algebraic Methods written by Chi-Tsong Chen and published by Saunders College Publishing Electrical Engineering (1995) (ISBN: 0030940702). The following general relations define the PID compensation scheme adopted for the position control path:

The user defined parameters are a set of weighting constants as well as a nominal, desired position represented as:

| | |
|---|---|
| $k_{1j}$ - direct error weight | j = 1,n (n = number of controlled devices) |
| $k_{2j}$ - first difference error weight | j = 1,n |
| $k_{3j}$ - second difference error weight | j = 1,n |
| $k_{4j}$ - integral error weight | j = 1,n |
| $x_{0j}$ - desired position | j = 1,n |

The processing calculations are performed as follows:

$$x_{j(k)} = \text{The position sensor input at sample } k, \text{ controlled device } j$$

$$e_j(k) = x_{0j} - x_j(k) = \text{The position error (i.e. offset from the desired position) at sample } k, \text{ valve } j$$

$$es_j(k) = es_j(k-1) + e_j(k) = \text{The accumulated position error}$$

$$y_j(k) = k_{ij}e_j(k) + k_2[e_j(k) - e_j(k-1)] + k_{3j}[e_j(k) - 2e_j(k-1) + e_j(k-2)] + k_{4j}es_j(k)$$

$$= \text{The position component of output control signal at sample } k \text{ for controlled device } j$$

The algorithm thus accommodates proportional, integral and derivative processing options corresponding to zero, first and second differences. Because the PID user defined constants might be unique for each controlled device, the position control compensation function 460 must store independent, unique PID constants for each controlled device. During each execution frame of the Controller 100, the position control path is executed once for each controlled device using the PID constants associated with the currently processed controlled device.

The desired position, $x_{0j}$, is the point within the controlled device's range at which maximum authority exists in all control directions for the vibration controller to utilize in reducing vibration. In a hydraulic actuator, for example, the desired position is in the area of the mid-point of the traversing path of the actuator 36 piston. It is the location which accommodates both positive and negative (asymmetric) signal swings for the signals corresponding to the frequencies in interest.

In the embodiment of the present invention shown in FIGS. 6A and 6B, the Controller 100 controls two hydraulic control valves 48 (FIG. 6B). In a rotary wing aircraft, each valve 48 could supply hydraulic fluid to a single actuator of an ATM mount 32, including a vertical actuator and a horizontal actuator. The desired position of the actuator piston is empirically determined by the user and is based upon the optimal position that minimizes enhancement of the frequencies of interest, given the fact that the vertical load is much higher than the horizontal load because the weight of the attached plant, in this case the airframe, is usually on the vertical load. This corresponds to a position off the mid-point of the vertical actuator 36 piston. The horizontal actuator 36 remains close to its mid-point trajectory. In the rotary wing aircraft, the desired actuator 36 position can be determined automatically, for example, by monitoring the maximum extents that occur during operation of the Controller 100 and altering the desired position to be the midpoints of those extents.

The values of the user-defined coefficients depend on the actuator valve to position sensor transfer function. The actuator valve to position sensor transfer function is determined by the characteristics of the controlled devices. For example, if the controlled device is a hydraulic actuator, multiple methods of actuation are known in the art and some of these methods result in different transfer functions. Two such differing actuation systems are flow control and pressure control. Direct command emphasizing the direct error weight, $k_{1j}$, would usually be used for flow control actuation systems while derivative control emphasizing the integral weight, $k_{4j}$, would be used for pressure control actuation systems.

In an active control system, the hydraulic valve 48 used for the ATM actuators 36 is preferably a flow control valve. In such a system, the low-frequency response of position to a flow command would be a single integral which calls for a direct command. It has been verified through measurements that the resultant actuator valve to position sensor transfer function approaches that of an integrator in the frequencies of interest. This measured gain is of the simplified form at low frequencies (neglecting the small phase delay)

$$P(s) = \frac{K_0}{s}$$

where P(s) is the actuator valve to position sensor transfer function, $K_0$ is a constant and s is the Laplacian variable. This actuator valve to position sensor transfer function is defined independently of the PID coefficient settings. However, the optimal PID coefficient settings are dependent on the transfer function, especially since there is a small (but non-zero) phase delay in the position control path attributed to the A/D and D/A process. This actuator valve to position sensor transfer function above requires nonzero coefficients for the direct terms, $k_{1j}$, and zero for the difference and integral components, $k_{2j}$, $k_{3j}$, and $k_{4j}$. The direct coefficients are determined analytically in order to prevent position controller instability. Methods of determining the coefficients for a particular plant transfer function are well known in the art. Equations and control design techniques are discussed in the Chen reference cited above.

Referring to FIG. 6B, after the position control path has generated an output position control value for each controlled device, an additional output scaling function 480 is applied to the output value position control compensation function 460. As described above in the vibration control post processing, the output scaling function 480 permits an additional adjustment of the degree of responsiveness by the controlled device. In a preferred embodiment, the output scaling function 480 consists of a single multiplication of each position control compensation function 460 output by a predetermined real number, the ValveGainFactor.

Position Control Pre-Run (ATMPC pre-run)

The ATMPC pre-run 410 function ascertains the initial average control static signal required to hold an average position. By determining the actuator valve 48 to position sensor 38 transfer function, the ATMPC pre-run 410 function permits the Controller 100 or user to more readily determine coefficients for the position control algorithm which, in a preferred embodiment, is the PID system described above. The pre-run function 410 is executed during a system initialization or setup phase. Sample output control values are sent to the controlled device and the resulting effect upon the input position sensor signals are correlated with the sample output control values. Based on this correlation, coefficients for the position control algorithm are calculated. During pre-run 410, either the raw output control value/input sensor signals or the calculated coefficients are stored to a physical medium like a disk drive 415 (FIG. 6A). An offline evaluation could be performed upon the raw data with the resulting coefficients programmed directly into the position compensation function 460 described above.

In the embodiment shown in FIGS. 6A and 6B, the ATMPC pre-run 410 function is implemented as follows:

x=valve command $x_0$=valve command for zero actuator motion $x_{01}$=estimate of valve command at minimum actuator position, $y_1$ $x_{02}$=estimate of valve command at maximum actuator position, $y_h$ $x_h$=maximum allowable valve command—input to this procedure $x_1$=minimum valve command—input to this procedure y=actuator position indication $Y_h$=maximum actuator position $y_1$=minimum actuator position $y_0$=actuator center position=$(y_h+y_1)/2$ K=actuator system gain=actuator speed/valve command T=period of applied square wave dx=amplitude of applied square wave The objective is to determine for each actuator/valve combination the values of $x_0$, $y_0$, and K. First, the ATMPC pre-run 410 function determines $x_{01}$ and $y_1$ as follows. Starting with the minimum valve voltage level, $x_1$, the corresponding actuator position, $y_1$, is measured. The valve command voltage at which the actuator position begins to move is $x_{01}$. Second, $x_{02}$ and $y_h$ are determined as follows. Starting with the maximum valve voltage, $x_h$, the corresponding actuator position, $y_h$, is measured. The valve command at which the value of y begins to decrease is $x_{02}$. Third, actuator midpoint, $y_0=(y_h+y_i)/2$, and the valve command for average center position, $x_0=(x_{01}+x_{02})/2$, are calculated. Fourth, K is measured K which, in the embodiment shown in FIGS. 6A and 6B, is the actuator speed for a flow control valve 48. Beginning with the minimum valve command, $x_1$, a square wave between $x_0$ and $x_0+dx$ with period T is applied until the actuator position reaches $y_0$. Next, a square wave between $x_0-dx$ and $x_0+dx$ with period T is applied. The output actuator position forms a triangular wave with amplitude dy. The system gain K can be calculated with the formula K=dy/(Tdx). This K, thus, corresponds to the transfer function of an integrator of the form:

$$F(s) = \frac{Y_d(s)}{X_d(s)} = \frac{K}{s}$$

where $Y_d(s)$ corresponds to the Laplace transform of the signal dy and $X_d(s)$ corresponds to the Laplace transform of the signal dx.

Preferably, the ATMPC pre-run 410 function is executed during initial system installation. Since the actuator valve to position sensor transfer function does not change frequently for a rotary wing aircraft application, the ATMPC pre-run 410 function would normally only be run after substantial changes have occurred in the associated plant. Preferably, for a rotary wing application, the position control prerun function would be performed automatically on system initialization.

Control Signal Summation

The summing function 62 (FIG. 6B) receives the vibration control output signals on line 206 from the vibration control path and the position control output signals on line 228 from the position control path and combines these signals. Preferably, the combination of signals is accomplished through an arithmetical addition of digital values. Other means of combining the signals include using a weighted function wherein the control signals input to the summing 62 function are given different relative weights in the resultant output signals. Further mathematical functions beyond addition could also be applied to the input control signals.

After combination, the combined signals are output to the hydraulic servo valves 48 on line 52. Because a hydraulic control valve 48 may respond to analog signals only, a conversion from digital format to analog format by a D/A converter (not shown) may be necessary before sending the combined signal to the hydraulic control valve 48. The D/A converter receives the digital combined signal on control line 52, converts that signal to analog form appropriate for the attached plant and then transmits that analog signal to the controlled device on a signal line which runs from the D/A converter to the controlled device.

The previously described embodiments of the present invention have many advantages, including effective control for an active system for reducing the transmission of vibration and noise between a vibrating component and a structure. The controller of the present invention transmits at least two output vibration cancellation signals which control a vibration cancellation mechanism while ensuring that sufficient authority exists in the vibration cancellation mechanism to respond to the vibration cancellation signals. The control system is particularly effective when the vibration cancellation mechanism is located within the connection points, or in series, between a vibration generating component and the mounting location of the component on the structure. In a rotary wing aircraft application including actuators mounted between the transmission gearbox feet and airframe, the controller for the active system isolates the main rotor system of the helicopter, and prevents the low frequency vibration generated by the main rotor system from being transmitted to the airframe while efficiently passing the primary flight loads. This active system must also maintain the average static position of the transmission relative to the airframe. The controller functions to maintain the actuator position at a predetermined point within a maximum range to which the vibration producing means is capable of responding to ensure the actuator has sufficient authority to respond to the vibration cancellation signals. Moreover, the effectiveness of passive vibration reduction techniques are enhanced when used in conjunction with the active vibration control system of the present invention.

Although the present invention has been shown and described in considerable detail with respect to only a few exemplary embodiments thereof, it should be understood by those skilled in the art that I do not intend to limit the invention to the embodiments since various modifications, omissions and additions may be made to the disclosed embodiments without materially departing from the novel teachings and advantages of the invention, particularly in light of the foregoing teachings. For example, it is apparent that the present invention could also be embodied in hardware circuitry which performs the same functional operations. Accordingly, I intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a crew may be equivalent structures.

We claim:

1. A control system for reducing vibration generated by a vibrating plant including a vibrating component, a structure and a mount for mounting the vibrating component to the structure, the control system comprising:
   a. means for producing controlled vibrations within the mount;
   b. at least one sensor for sensing the current position of the controlled vibration producing means and developing a signal indicative thereof;
   c. at least one sensor for sensing the vibration being transmitted through the mount from the vibrating component to the structure and developing a signal indicative thereof;
   d. at least one sensor for sensing at least one of the characteristic frequencies at which the vibrating plant operates and developing a signal indicative thereof;
   e. a first controller receiving as input the position signal developed by the controlled vibration producing means sensor and generating an output signal;
   f. a second controller receiving as input the transmitted vibration sensor signal and the characteristic sensor signal and generating an output signal; and
   g. means for combining the output signals from the first and second controllers into a control signal for controlling the vibration producing means such that the vibration transmitted from the vibrating component to the structure through the mount is reduced.

2. The control system according to claim 1, wherein the first controller responds to the controlled vibration producing means position sensor by providing output signals which maintain a desired position of the controlled vibration producing means.

3. The control system according to claim 1, wherein the first controller produces a quasi-static, fixed, low bandwidth, broadband control signal.

4. The control system according to claim 3, wherein the first controller comprises a compensation function utilizing proportional, integral, derivative control.

5. The control system according to claim 1, wherein the second controller produces a narrow-band feedback vibration control signal.

6. The control system according to claim 5, wherein the second controller comprises
   a. a frequency filter adaptive to isolate sensed vibration signals at frequencies which are multiples of the sensed characteristic plant frequency;
   b. an objective function characterizing the magnitude of said isolated signals;
   c. a compensation function producing a correlation between said isolated signals and said control signal for said controlled vibration producing means; and
   d. an adaptive filter which generates attenuation output signals minimizing said isolated, correlated signals.

7. An active vibration control system for reducing vibration generated by a vibrating plant including a vibrating component, a structure and a hydraulic mount for mounting the vibrating component to the structure, the vibration transmitted from the vibrating component through the hydraulic mount to the structure, the control system comprising:
   a. at least one hydraulic actuator for producing controlled vibrations within the mount;
   b. at least one position sensor for sensing the current position of the hydraulic actuator and producing a signal representative thereof;
   c. at least one vibration sensor for sensing vibrations being transmitted from the vibrating component through the hydraulic mount to the structure and producing a signal representative thereof;
   d. at least one vibrating plant sensor for sensing at least one of the rotational frequencies at which said vibrating plant operates and producing a signal representative thereof;
   e. a fixed, low bandwidth, near-DC, PID-based broadband control compensation feedback position controller which utilizes the position sensor signal to produce position control signals to minimize the offset between the sensed hydraulic actuator position and a predetermined hydraulic actuator position;
   f. an adaptive Filtered-X LMS based narrow-band vibration controller which utilizes the vibration sensor signal to produce vibration control signals at multiple frequencies of the sensed plant characteristic frequencies; and
   g. means for combining position control signals with the vibration control signals and generating an output signal, the hydraulic actuator being responsive to the output signal of the combining and output signal generating means for producing controlled vibrations in the mount for reducing vibrations transmitted through the mount from the vibrating component to the structure.

8. The control system according to claim 7, wherein the position controller comprises:
   a. a scaling function;
   b. a band elimination function;
   c. an objective function; and
   d. a compensation function.

9. The control system according to claim 8, wherein the compensation function produces the position control signal utilizing proportional, integral, derivative control compensation.

10. The control system according to claim 7, wherein the vibration controller comprises:
    a. a frequency filter adaptive to isolate sensed vibration signals at frequencies which are multiples of the sensed plant characteristic frequency;
    b. an objective function characterizing the magnitude of the isolated signals;
    c. a compensation function producing a correlation between the isolated signals and the control signal for the controlled vibration producing means; and
    d. an adaptive filter which generates attenuation output signals minimizing the isolated, correlated signals.

11. The control system according to claim 10, wherein the vibration controller further comprises:
    a. a frequency downshift function which converts the vibration sensor signals to signals at baseband DC; and
    b. a frequency upshift function which converts the baseband DC signals into in-band, attenuation path-based, vibration control signals.

12. The control system according to claim 11, wherein the vibration controller further comprises:
    a. an input function which performs antialiasing and scaling functions on the vibration sensor signals;
    b. a normalization function which normalizes the isolated signals;
    c. an output function which scales the vibration control signals; and
    d. a weight limiting function which evaluates the vibration control signals and transmits a freeze signal to the adaptive filter function affecting the adaptive abilities of the adaptive filter function.

13. The control system according to claim 12, wherein the frequency filter comprises:
    a. a band-pass filter; and
    b. a notch filter receiving as input the plant rotational frequency, the notch filter adapting its filter window based on the input plant rotational frequency.

14. An active vibration control system for reducing vibration in a rotary wing aircraft, the rotary wing aircraft including an airframe and a main rotor system having a rotor, an engine and a transmission gearbox mounted to the airframe for turning the engine force into the rotational force of a rotorshaft, the gearbox attached to the airframe with at least one hydraulic mount between the gearbox and the airframe, wherein the operation of the main rotor system generates vibration that is transferable to the airframe causing vibration on board the aircraft, the control system comprising:
    a. at least one hydraulic actuator for producing controlled vibrations within the mount;
    b. at least one position sensor for sensing the current position of the hydraulic actuator and producing a signal representative thereof;
    c. at least one vibration sensor for sensing vibrations being transmitted from the main rotor system through the mount to the airframe and producing a signal representative thereof;
    d. at least one rotational sensor for sensing the rotational frequency of the rotorshaft and producing a signal representative thereof;
    e. a fixed, low bandwidth, near-DC, broadband control compensation feedback position controller which utilizes the position sensor signal to produce quasi-static position control signals to minimize the offset between the sensed hydraulic actuator position and a predetermined hydraulic actuator position;

f. an adaptive Filtered-X LMS based narrow-band vibration controller which utilizes the vibration sensor signal to produce vibration control signals; and g. means for combining the position control signals with the vibration control signals and generating an output signal, the hydraulic actuator being responsive to the output signal of the combining and output signal generating means for producing controlled vibrations in the mount for reducing vibrations transmitted through the mount from the engine and rotor system to the airframe.

15. The control system according to claim 14, wherein the position controller comprises:

a. a scaling function;

b. a band elimination function;

c. an objective function; and d. a compensation function.

16. The control system according to claim 15, wherein the compensation function produces the position control signal utilizing proportional, integral, derivative control compensation.

17. The control system according to claim 14, wherein said vibration controller comprises:

a. a frequency filter adaptive to isolate sensed vibration signals at frequencies which are multiples of the sensed rotorshaft frequency;

b. an objective function characterizing the magnitude of the isolated signals;

c. a compensation function producing a correlation between the isolated signals and the control signal for the; and d. an adaptive filter which generates attenuation output signals minimizing the isolated, correlated signals.

18. The control system according to claim 17, wherein the vibration controller further comprises:

a. a frequency downshift function which converts the vibration sensor signals to signals at baseband DC; and b. a frequency upshift function which converts the baseband DC signals into in-band, attenuation path-based, vibration control signals.

19. The control system according to claim 18, wherein said vibration controller further comprises:

a. an input function which performs antialiasing and scaling functions on the vibration sensor signals;

b. a normalization function which normalizes the isolated signals;

c. an output function which scales the vibration control signals; and d. a weight limiting function which evaluates the vibration control signals and transmits a freeze signal to the adaptive filter function affecting the adaptive abilities of the adaptive filter function.

20. The control system according to claim 19, wherein the frequency filter comprises:

a. a band-pass filter; and b. a notch filter receiving as input the rotorshaft rotation frequency, the notch filter adapting its filter window based on the input rotorshaft rotation frequency.

* * * * *